(12) United States Patent
Akkarakaran et al.

(10) Patent No.: US 11,856,638 B2
(45) Date of Patent: Dec. 26, 2023

(54) DISCONTINUOUS RECEPTION CONFIGURATION AND SIDELINK OPERATION WITH MODE-1 AND MODE-2 SCHEDULING

(71) Applicant: QUALCOMM Incorporated, San Diego, CA (US)

(72) Inventors: Sony Akkarakaran, Poway, CA (US); Ling Ding, Chester, NJ (US); Junyi Li, Franklin Park, NJ (US); Tao Luo, San Diego, CA (US); Jung Ho Ryu, Fort Lee, NJ (US); Jelena Damnjanovic, Del Mar, CA (US); Kapil Gulati, Belle Mead, NJ (US); Hong Cheng, Basking Ridge, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/173,013

(22) Filed: Feb. 10, 2021

(65) Prior Publication Data
US 2021/0251037 A1 Aug. 12, 2021

Related U.S. Application Data

(60) Provisional application No. 62/975,071, filed on Feb. 11, 2020, provisional application No. 62/975,079, filed on Feb. 11, 2020.

(51) Int. Cl.
*H04W 76/28* (2018.01)
*H04W 72/23* (2023.01)
*H04W 92/18* (2009.01)

(52) U.S. Cl.
CPC .......... *H04W 76/28* (2018.02); *H04W 72/23* (2023.01); *H04W 92/18* (2013.01)

(58) Field of Classification Search
None
See application file for complete search history.

(56) References Cited

U.S. PATENT DOCUMENTS 9,661,684 B2 * 5/2017 Siomina ................ H04W 76/28
10,129,924 B2 * 11/2018 Siomina ................ H04W 72/02
(Continued)

FOREIGN PATENT DOCUMENTS

| KR | 20210038323 A | 4/2021 | |
| WO | 2017171477 A1 | 10/2017 | |
| WO | 2021060786 A1 | 4/2021 | |
| WO | WO-2021119474 A1 * | 6/2021 | ........ H04W 72/0406 |

OTHER PUBLICATIONS

Apple: "Discussion on HARQ Related Timers in SL DRX", 3GPP TSG-RAN WG2 Meeting #113e, 3GPP Draft, R2-2100863, Online, 3rd Generation Partnership Project (3GPP), Mobile Competence Centre, 650, Route Des Lucioles, F-06921 Sophia-Antipolis Cedex, France, vol. RAN WG2, No. Online, Jan. 26, 2020-Feb. 5, 2020, 3 Pages, Jan. 15, 2021 (Jan. 15, 2021), XP051973960, the whole document.

(Continued)

*Primary Examiner* — Jamaal Henson
(74) *Attorney, Agent, or Firm* — ArentFox Schiff LLP

(57) ABSTRACT

Example implementations include a method, apparatus and computer-readable medium of wireless communication over a sidelink between a first user equipment (UE) and a second UE. The first UE may receive, from a base station, a first sidelink grant for a transmission between the first UE and the second UE. The first UE may communicate the transmission according to the sidelink grant. The first UE may monitor a configured duration of a sidelink round trip time timer from the transmission. The first UE may monitor a configured duration of a sidelink retransmission timer from an end of the sidelink round trip time timer. The first UE may allow start of a discontinuous reception (DRX) mode after the duration of the sidelink retransmission time if a second grant is not received during the sidelink retransmission timer.

25 Claims, 13 Drawing Sheets

(56) References Cited

U.S. PATENT DOCUMENTS

| | | | | |
|---|---|---|---|---|
| 2016/0066356 | A1* | 3/2016 | Lindoff | H04W 72/535 |
| | | | | 370/329 |
| 2016/0219443 | A1* | 7/2016 | Lee | H04W 24/02 |
| 2016/0262118 | A1* | 9/2016 | Kim | H04L 5/001 |
| 2016/0366645 | A1* | 12/2016 | Song | H04W 52/0229 |
| 2017/0078964 | A1* | 3/2017 | Siomina | H04W 76/28 |
| 2019/0098689 | A1* | 3/2019 | Wei | H04W 72/23 |
| 2020/0275474 | A1* | 8/2020 | Chen | H04L 1/1848 |
| 2020/0304968 | A1* | 9/2020 | Lee | H04W 4/40 |
| 2021/0037468 | A1* | 2/2021 | Huang | H04W 76/23 |
| 2021/0051588 | A1* | 2/2021 | Wu | H04W 52/0235 |
| 2021/0385710 | A1* | 12/2021 | Jin | H04W 36/0072 |

OTHER PUBLICATIONS

Ericsson: "Running MAC CR for LAA", 3GPP TSG-RAN WG2 Meeting #94, 3GPP Draft, 36321_CR0874_(REL-14)_R2-164013—Running MAC CR for LAA, 3rd Generation Partnership Project (3GPP), Mobile Competence Centre, 650, Route Des Lucioles, F-06921 Sophia-Antipolis Cedex, F, vol. RAN WG2, No. Nanjing, P.R. China, May 23, 2016-May 27, 2016, 78 Pages, May 13, 2016 (May 13, 2016), XP051095847, Retrieved from the Internet: URL: http://www.3gpp.org/ftp/tsg_ran/WG2_RL2/TSGR2_94/Docs/ [retrieved on May 13, 2016] the whole document.

Interdigital Inc: "Discussion on Uu DRX for SL UE", 3GPP RAN WG2 Meeting #112 electronic, 3GPP Draft, R2-2009211, Online, 3rd Generation Partnership Project (3GPP), Mobile Competence Centre, 650, Route Des Lucioles, F-06921 Sophia-Antipolis Cedex, France, vol. RAN WG2, No. electronic, Nov. 1, 2020, 3 Pages, Nov. 2020, XP051942218, Oct. 22, 2020 (Oct. 22, 2020), the whole document.

International Search Report and Written Opinion—PCT/US2021/017605—ISA/EPO—dated May 17, 2021.

* cited by examiner

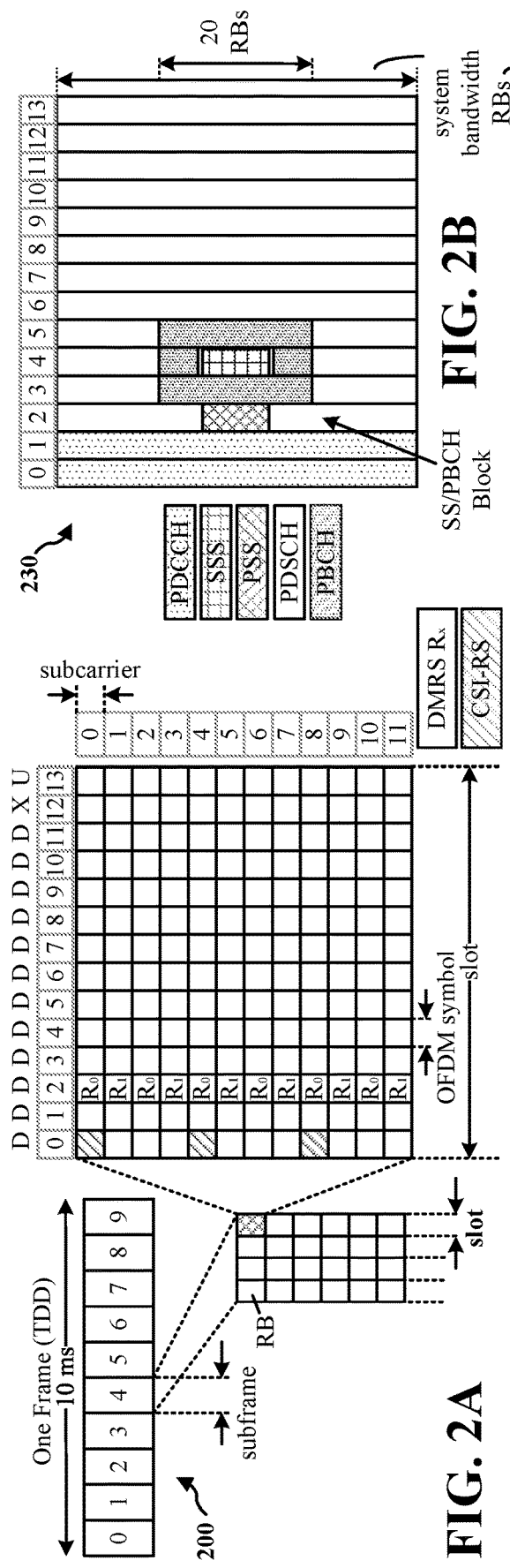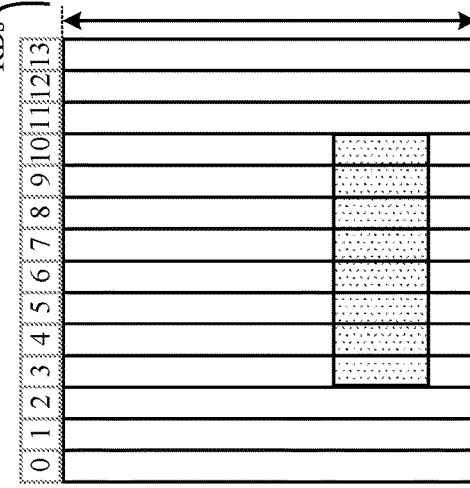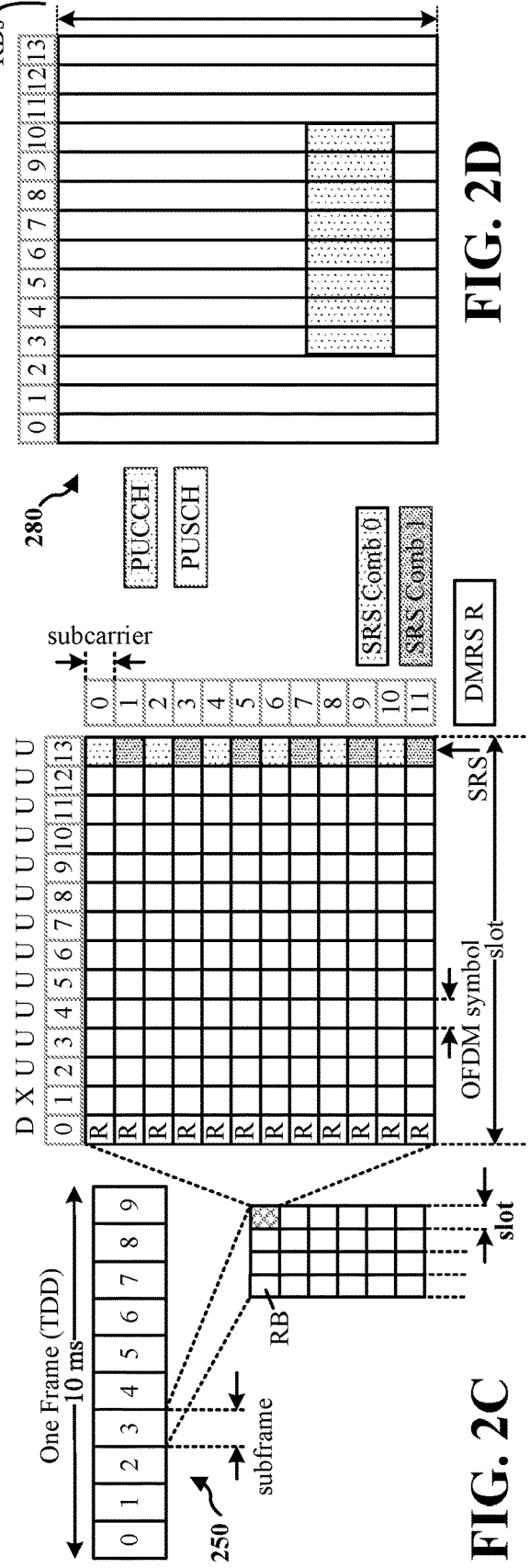
FIG. 2A
FIG. 2B
FIG. 2C
FIG. 2D

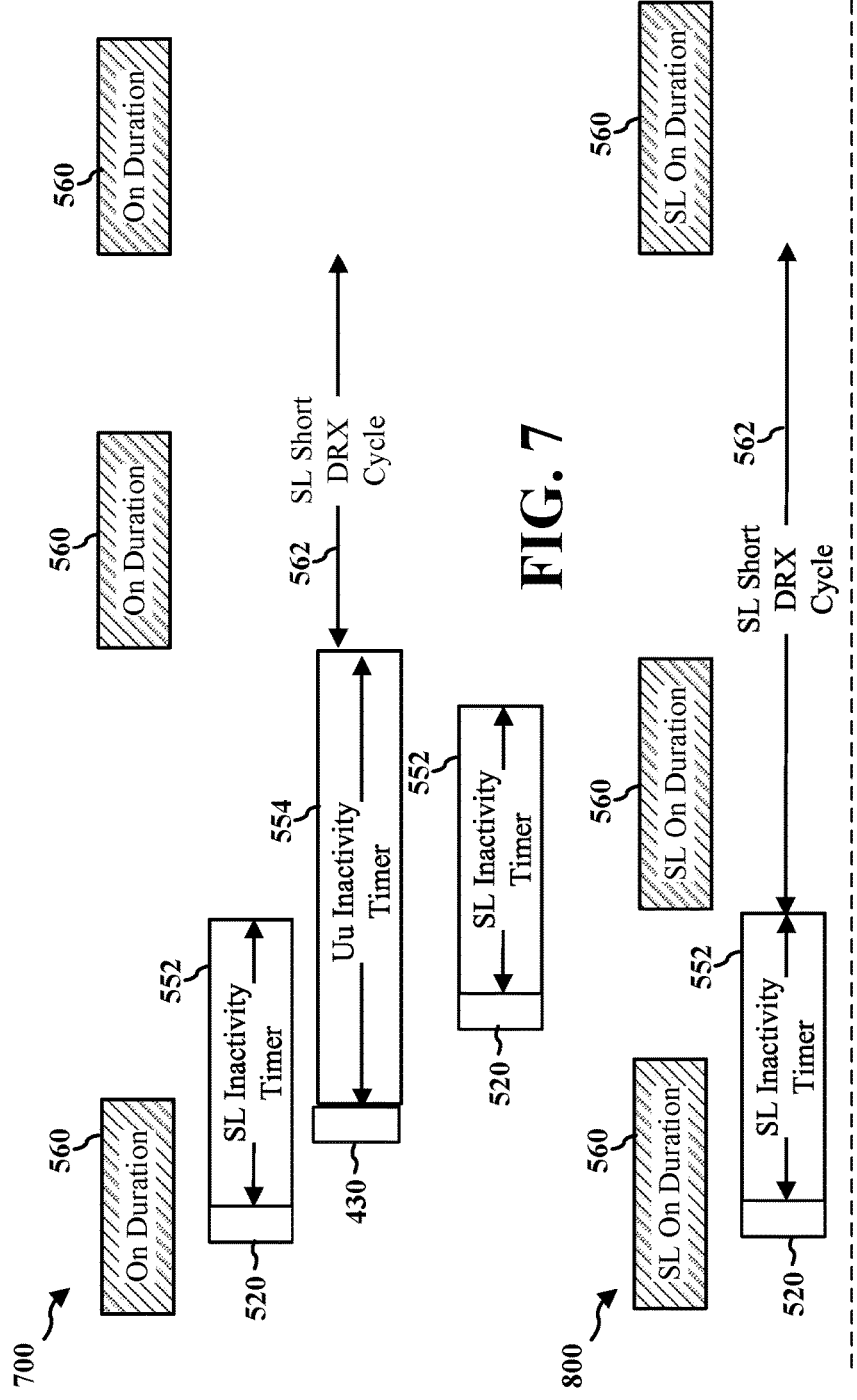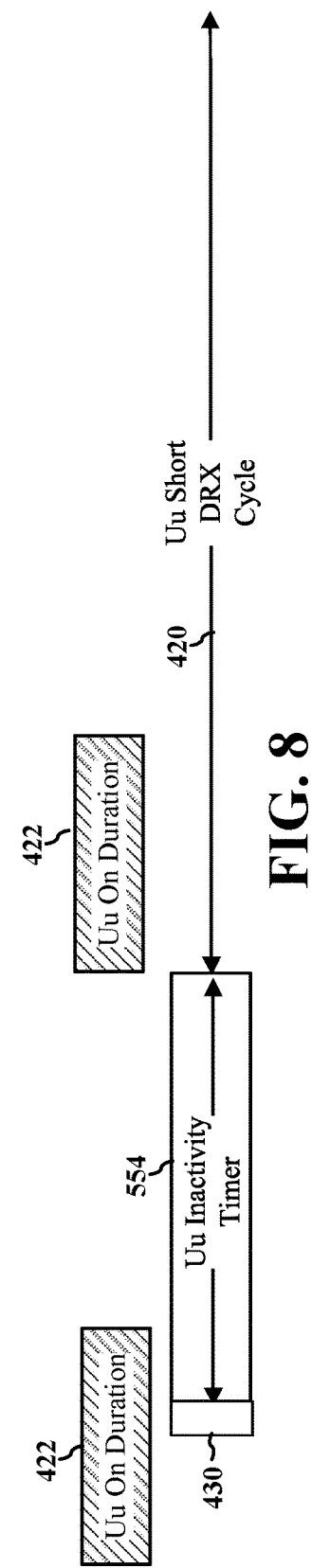

DISCONTINUOUS RECEPTION CONFIGURATION AND SIDELINK OPERATION WITH MODE-1 AND MODE-2 SCHEDULING

CROSS REFERENCE TO RELATED APPLICATIONS

This application claims priority to U.S. Provisional Application No. 62/975,079 titled "DISCONTINUOUS RECEPTION CONFIGURATION AND SIDELINK OPERATION WITH MODE-1 SCHEDULING," filed Feb. 11, 2020, and to U.S. Provisional Application No. 62/975,071 titled "DISCONTINUOUS RECEPTION CONFIGURATION AND SIDELINK OPERATION WITH MODE-2 SCHEDULING," filed Feb. 11, 2020, both of which are assigned to the assignee hereof, and incorporated herein by reference in their entirety.

BACKGROUND

Technical Field

The present disclosure relates generally to communication systems, and more particularly, to apparatuses and methods of discontinuous reception (DRX) for sidelink operation, where sidelink is a direct link between two devices.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect, the disclosure provides a method of wireless communication for a first user equipment (UE). The method may include receiving, from a base station, a first sidelink grant for a transmission between the first UE and a second UE. The method may include communicating the transmission according to the sidelink grant. The method may include monitoring a configured duration of a sidelink round trip timer from the transmission. The method may include monitoring a configured duration of a sidelink retransmission timer from an end of the sidelink round trip timer. The method may include allowing start of a discontinuous reception (DRX) mode after the duration of the sidelink retransmission timer if a second grant is not received during the sidelink retransmission timer.

The disclosure also provides an apparatus (e.g., a user equipment) including a memory storing computer-executable instructions and at least one processor configured to execute the computer-executable instructions to perform the above method, an apparatus including means for performing the above method, and a computer-readable medium storing computer-executable instructions for performing the above method.

In an aspect, the disclosure provides a method of wireless communication for a first UE. The method may include receiving, from a base station, a sidelink resource configuration indicating physical sidelink control/shared channel (PSCCH/PSSCH) occasions on which to monitor a PSCCH for a grant from a second UE. The method may include identifying an active time for monitoring the PSCCH based on a DRX mode for a link with the base station, the DRX mode including an active state in which a physical downlink control channel (PDCCH) is monitored and an inactive state in which the PDCCH is not monitored. The method may include monitoring the PSCCH during one or more of the PSCCH/PSSCH occasions that coincide with the active time.

The disclosure also provides an apparatus (e.g., a user equipment) including a memory storing computer-executable instructions and at least one processor configured to execute the computer-executable instructions to perform the above method, an apparatus including means for performing the above method, and a computer-readable medium storing computer-executable instructions for performing the above method.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first 5G NR frame.

FIG. 2B is a diagram illustrating an example of DL channels within a 5G NR subframe.

FIG. 2C is a diagram illustrating an example of a second 5G NR frame.

FIG. 2D is a diagram illustrating an example of UL channels within a 5G NR subframe.

FIG. 7 is a timing diagram of an example of sidelink DRX operation for mode 1 scheduling using a joint inactivity timer.

FIG. 8 is a timing diagram of an example of sidelink DRX operation for mode 1 scheduling using separate inactivity timers.

DETAILED DESCRIPTION

Figure 1:
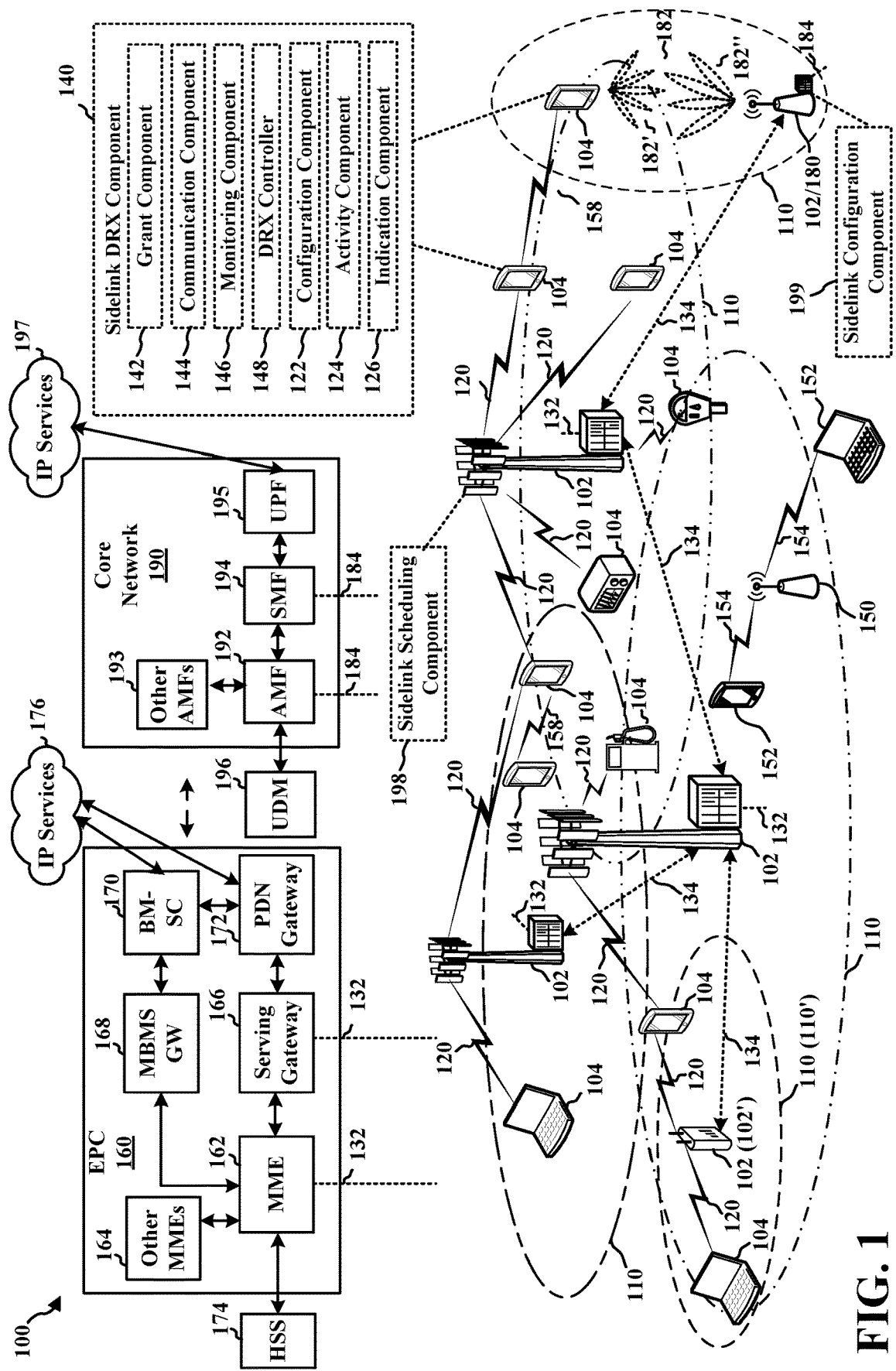
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

A user equipment (UE) in communication with another device (e.g., a base station) may actively monitor a control channel (e.g., a physical downlink control channel (PDCCH)) for a grant scheduling a transmission. When the UE is not actively receiving data, the UE may conserve power by entering a discontinuous reception mode (DRX) in which the UE monitors the control channel during an active time and an on duration of a DRX cycle and may sleep during an off portion of the DRX cycle. That is, the UE may not monitor the control channel during the off portion of the DRX cycle and a base station may avoid transmitting the control channel to the UE during the off portion of the DRX cycle.

The described features generally relate to synchronization signals for direct link communications of device-to-device (D2D) communication technologies. As used herein, a direct link refers to a direct wireless communications path from a first wireless device to a second wireless device. For example, in fifth generation (5G) new radio (NR) communication technologies a direct link between two user equipment (UEs) may be referred to as a sidelink (SL), as opposed to communications over the Uu interface (e.g., from gNB to UE). Direct links may be utilized in D2D communication technologies that can include vehicle-to-vehicle (V2V) communications, vehicle-to-infrastructure (V2I) communications (e.g., from a vehicle-based communication device to road infrastructure nodes), vehicle-to-network (V2N) communications (e.g., from a vehicle-based communication device to one or more network nodes, such as a base station), a combination thereof and/or with other devices, which can be collectively referred to as vehicle-to-anything (V2X) communications. In V2X communications, vehicle-based communication devices can communicate with one another and/or with infrastructure devices over a direct link channel.

A UE may be configured for mode 1 sidelink scheduling in which the base station (e.g., gNB) may be responsible for scheduling sidelink transmissions between UEs. The base station may transmit a grant (e.g., downlink control information (DCI)) on a physical downlink control channel (PDCCH) to a transmitting UE and/or the receiving UE. The transmitting UE may transmit a physical sidelink control channel (PSCCH) to provide additional information about the transmission (e.g., modulation and coding scheme (MCS)). Hybrid automatic repeat request (HARQ) acknowledgments for sidelink communications may be transmitted either via the Uu link to the base station or via the sidelink (e.g., on a physical sidelink feedback channel (PSFCH)). Due to the differences between Uu link and sidelink communications, DRX procedures for the Uu link may not be sufficient for the sidelink with mode 1 scheduling.

In an aspect, the present disclosure provides for DRX configuration and procedures for sidelink communications using mode 1 scheduling. A first UE may receive, from a base station, a first sidelink grant for a transmission between the first UE and a second UE. The transmission may be either a sidelink transmission from the first UE to the second UE or a sidelink reception of a transmission from the second UE to the first UE. In either case, the UE may communicate (e.g., transmit or receive) the transmission according to the sidelink grant. In response to the transmission, the first UE may monitor a configured duration of a sidelink round trip time (RTT). The configured duration of the sidelink RTT may be referred to as a sidelink RTT timer. The configured duration of the sidelink RTT timer may start after a sidelink transmission, or after transmitting an acknowledgment for a sidelink reception. In an aspect, if the UE is no longer in DRX active time during the SL RTT timer, the UE may not monitor for another grant. After the RTT timer, the UE may monitor a configured duration of a sidelink retransmission (ReTX) timer from an end of the sidelink RTT timer. The UE may allow start of a DRX mode after the duration of the sidelink ReTX timer if a second grant is not received during the sidelink ReTX timer.

A UE may be configured for mode 2 sidelink scheduling in which the base station (e.g., gNB) may configure PSCCH/PSSCH occasions on which the UE is to monitor a PSCCH for a sidelink grant from a second UE for receiving the PSSCH. The PSSCH/PSSCH occasions may define time-domain and frequency-domain resources on which the PSCCH and the PSSCH may be received when the UE is configured for mode 2 sidelink scheduling. The time-domain resources may be defined as a number of slots or number of symbols. The frequency-domain resources may be defined as a number of sub-carriers. The second UE may be configured with transmission resources corresponding to the PSCCH/PSSCH occasions. When the second UE has data to transmit to the first UE, the second UE may autonomously schedule a sidelink transmission using the PSCCH/PSSCH occasions. HARQ acknowledgments for sidelink communications may be transmitted either via the Uu link to the base station or via the sidelink (e.g., on a PSFCH). Due to the differences between Uu link and sidelink communications, DRX procedures for the Uu link may not be sufficient for the sidelink with mode 2 scheduling.

In an aspect, the present disclosure provides for DRX configuration and procedures for sidelink communications using mode 2 scheduling. A first UE may receive, from a base station, a sidelink resource configuration indicating PSCCH/PSSCH occasions on which to monitor the PSCCH for a grant from a second UE. The first UE may identify an active time for monitoring the PSCCH based on a DRX mode for a link with the base station. The DRX mode may include an active state in which a PDCCH is monitored and an inactive state in which the PDCCH is not monitored. The first UE may monitor the PSCCH during one or more of the PSCCH/PSSCH occasions that coincide with the active time. In an aspect, the active time may include the configured PSCCH/PSSCH occasions such that all of the configured PSCCH/PSSCH occasions are monitored. In another aspect, the first UE may notify the second UE when the first UE is the active state either via an awake indication or a response to a ping from the second UE. In another aspect, the first UE may start a sidelink specific HARQ round trip timer in response to a sidelink transmission to determine whether to monitor the PSCCH for a retransmission grant.

In another aspect, the first UE may transmit a sidelink transmission to the second UE. The first UE may transmit a sidelink grant to the second UE on the PSCCH for a sidelink transmission from the first UE. The sidelink resource configuration may indicate resources for transmitting on the PSCCH. In an aspect, the resources for transmitting on the PSCCH may be considered active time for the DRX mode. In another aspect, the first UE may select resources for transmitting on the PSCCH that are within the active time of the DRX mode.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

In an aspect, one or more of the UEs 104 may include a sidelink DRX component 140 that controls discontinuous reception for sidelink communications. The sidelink DRX component 140 may include a grant component 142 configured to receive, from a base station, a first sidelink grant for a transmission between the UE and a second UE. The sidelink DRX component 140 may include a communication component 144 configured to communicate the transmission according to the sidelink grant. The sidelink DRX component 140 may include a monitoring component 146 configured to monitor a configured duration of a sidelink round trip time timer from the transmission and monitors a configured duration of a sidelink retransmission timer from an end of the sidelink round trip time timer. The sidelink DRX component 140 may include a DRX controller 148 configured to allow a start of a DRX mode after the duration of the sidelink retransmission timer if a second grant is not received during the sidelink retransmission timer. The start of a DRX mode may refer to following a configured DRX ON/OFF pattern. For mode 2 scheduling, the sidelink DRX component 140 may include a configuration component 122 configured to receive, from the base station 102, a sidelink resource configuration indicating PSCCH/PSSCH occasions on which to monitor a PSCCH for a grant from a second UE. The sidelink DRX component 140 may include an activity component 124 configured to identify an active time for monitoring the PSCCH based on a DRX mode for a link with the base station. The monitoring component 146 may be configured to monitor the PSCCH during one or more of the PSCCH/PSSCH occasions that coincide with the active time. The sidelink DRX component 140 may include an indication component 126 configured to transmit an indication that the UE 104 is in an active time.

In an aspect, one or more of the base stations 102 may include a sidelink scheduling component 198 that is configured to transmit the first sidelink grant for mode 1 scheduling. Further, the sidelink scheduling component 198 may monitor a DRX mode for the UE 104 based on the scheduled sidelink transmission and avoid transmitting a grant during an off portion of a DRX mode.

In an aspect, one or more of the base stations 102 may include a sidelink configuration component 199 that is configured to transmit the sidelink resource configuration.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface), which may be wired or wireless. The base stations 102 configured for 5G NR (collectively referred to as Next Generation RAN (NG-RAN)) may interface with core network 190 through second backhaul links 184, which may be wired or wireless. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL).

The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" (mmW) band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band. Communications using the mmW radio frequency band have extremely high path loss and a short range. The mmW base station 180 may utilize beamforming 182 with the UE 104 to compensate for the path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Although the following description may be focused on 5G NR, the concepts described herein may be applicable to other similar areas, such as LTE, LTE-A, CDMA, GSM, and other wireless technologies.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$ there are 14 symbols/slot and $2^\mu$ slots/subframe. The subcarrier spacing and symbol length/duration are a function of the numerology. The subcarrier spacing may be equal to V*15 kHz, where $\mu$ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 2A-2D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
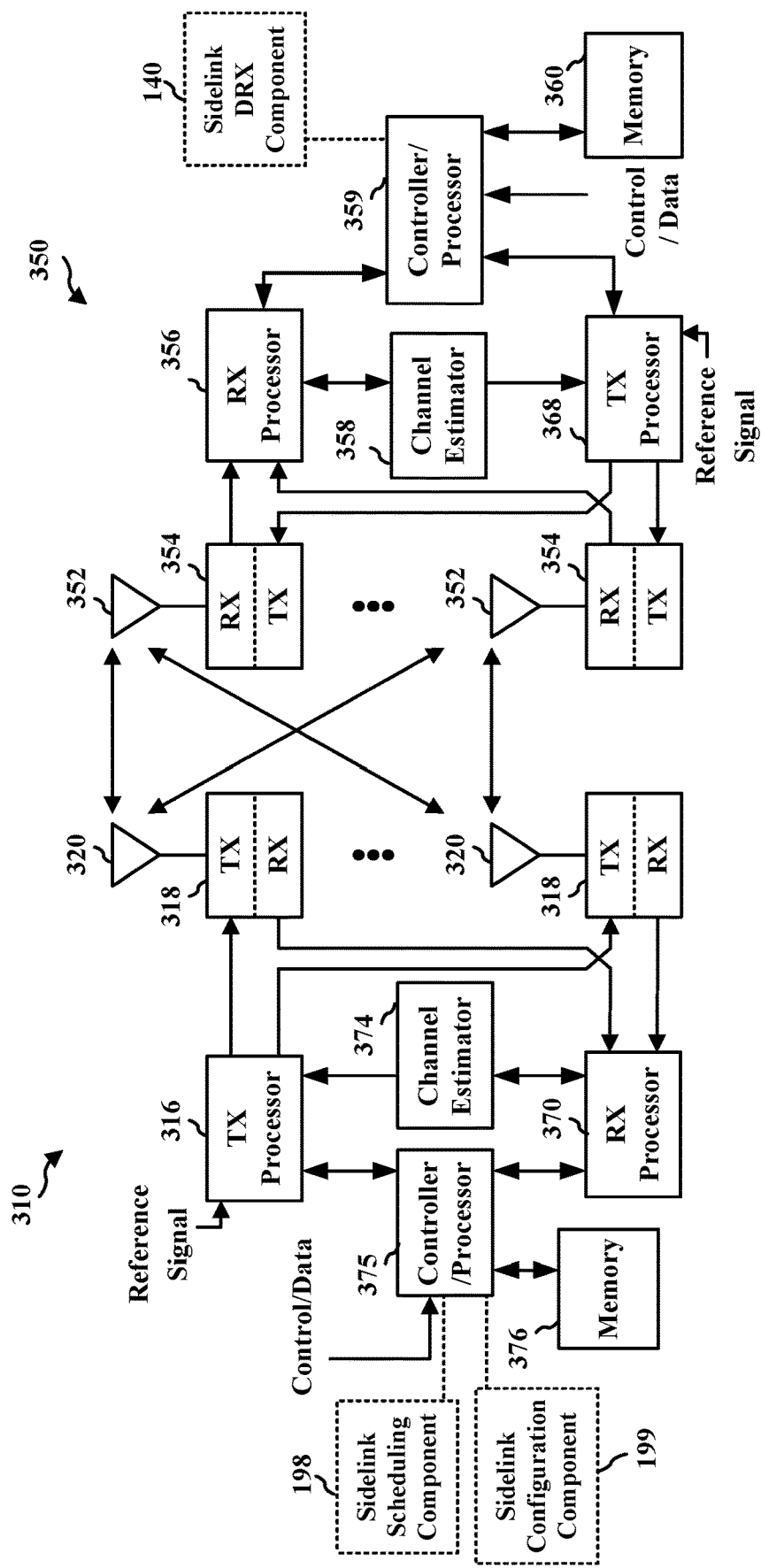
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each sub-carrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the sidelink DRX component 140 of FIG. 1.

At least one of the TX processor 316, the RX processor 370, and the controller/processor 375 may be configured to perform aspects in connection with the sidelink scheduling component 198 of FIG. 1 and/or the sidelink configuration component 199 of FIG. 1.

Figure 4:
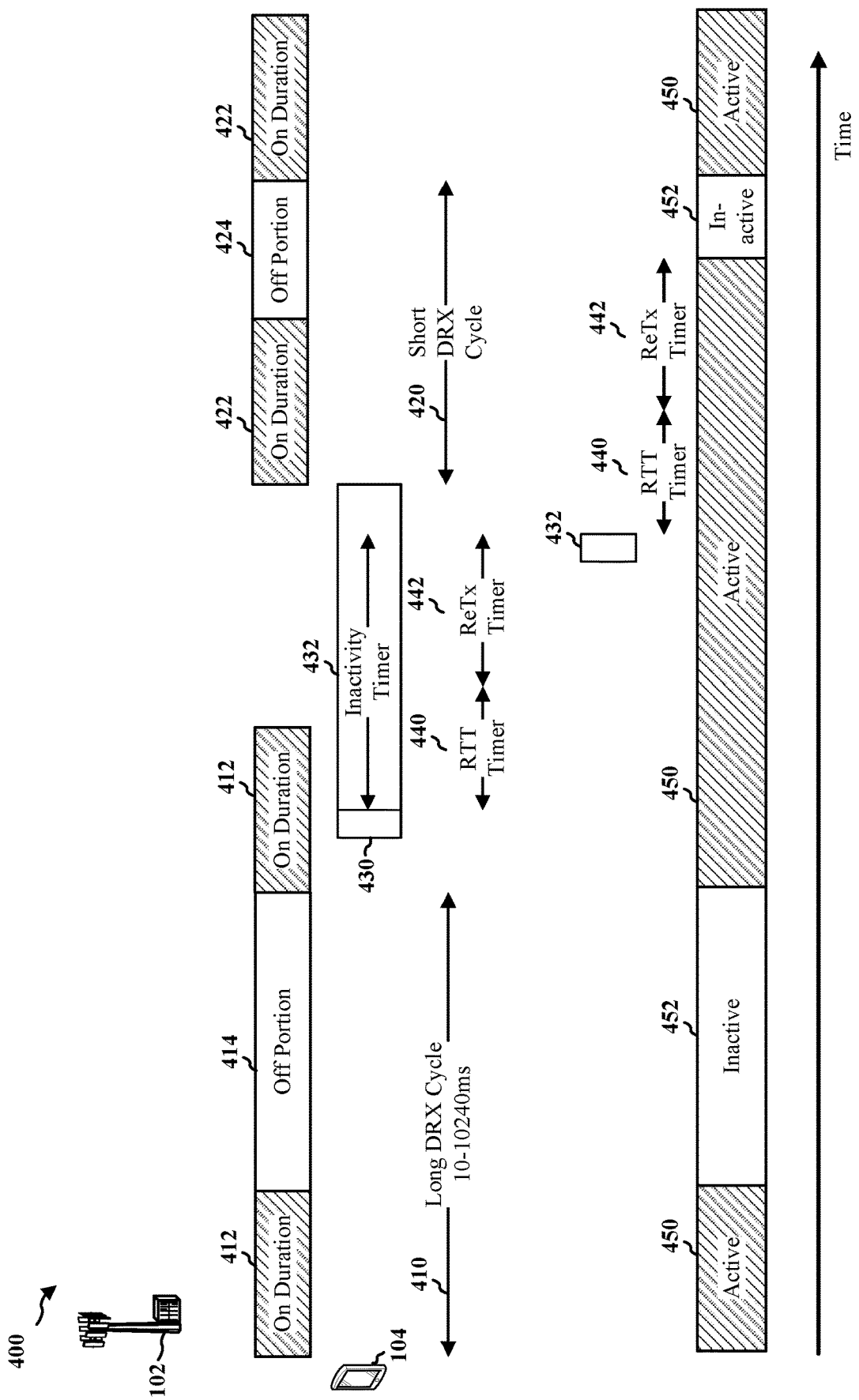
FIG. 4 is a timing diagram of an example of DRX operation for a link between a base station and a UE.

FIG. 4 is a diagram 400 illustrating an example of DRX operation for a Uu link between a base station 102 and a UE 104. The UE 104 may be configured with a long DRX cycle 410 and a short DRX cycle 420. The long DRX cycle 410 may include an on duration 412 during which the UE 104 monitors a PDCCH for grants and an off portion 414 during which the UE 104 may not monitor the PDCCH for grants. When the UE 104 receives a grant for a new transmission (e.g., grant 430), the UE 104 may start an inactivity timer 432. The inactivity timer 432 may be reset whenever a grant for a new transmission is received and the UE 104 may monitor the PDCCH for grants while the inactivity timer 432 is running. When the inactivity timer 432 expires, the UE 104 may start the short DRX cycle 420 including the on duration 422, which may be different than the on duration 412 of the long DRX cycle, and the off portion 424, which may be different than the off portion 414 of the long DRX cycle.

The UE 104 may also start a round trip time (RTT) timer 440 for a HARQ process of the transmission. If the transmission is an uplink transmission, the RTT timer 440 may start at the end of the transmission. If the transmission is a downlink transmission, the RTT timer 440 may start at the end of an ACK/NACK for the transmission. The RTT timer 440 may measure an amount of time until the UE 104 is to monitor for a grant for a possible retransmission. The UE 104 may start a retransmission (ReTx) timer 442 to monitor a window during which a grant for the retransmission may be received. If the UE 104 receives a grant 430 for a retransmission, the UE 104 may start the RTT timer 440 again and monitor for a grant while the ReTx timer 442 is running. Because a grant for a retransmission does not restart the inactivity timer 432, the RTT timer 440 and/or the ReTx timer 442 may run while the UE 104 is in the short DRX cycle. The UE 104 may monitor for the retransmission grant during the short DRX cycle 420 even if the UE 104 is not in the on duration 422. The UE 104 may be in an active state 450 in which the UE 104 monitors the PDCCH when any of the long DRX on duration 412, short DRX on duration 422, inactivity timer 432, or ReTx timer 442 are running. The UE 104 may be in an inactive state 452 when none of the long DRX on duration 412, short DRX on duration 422, inactivity timer 432, or ReTx timer 442 are running.

Figure 5:
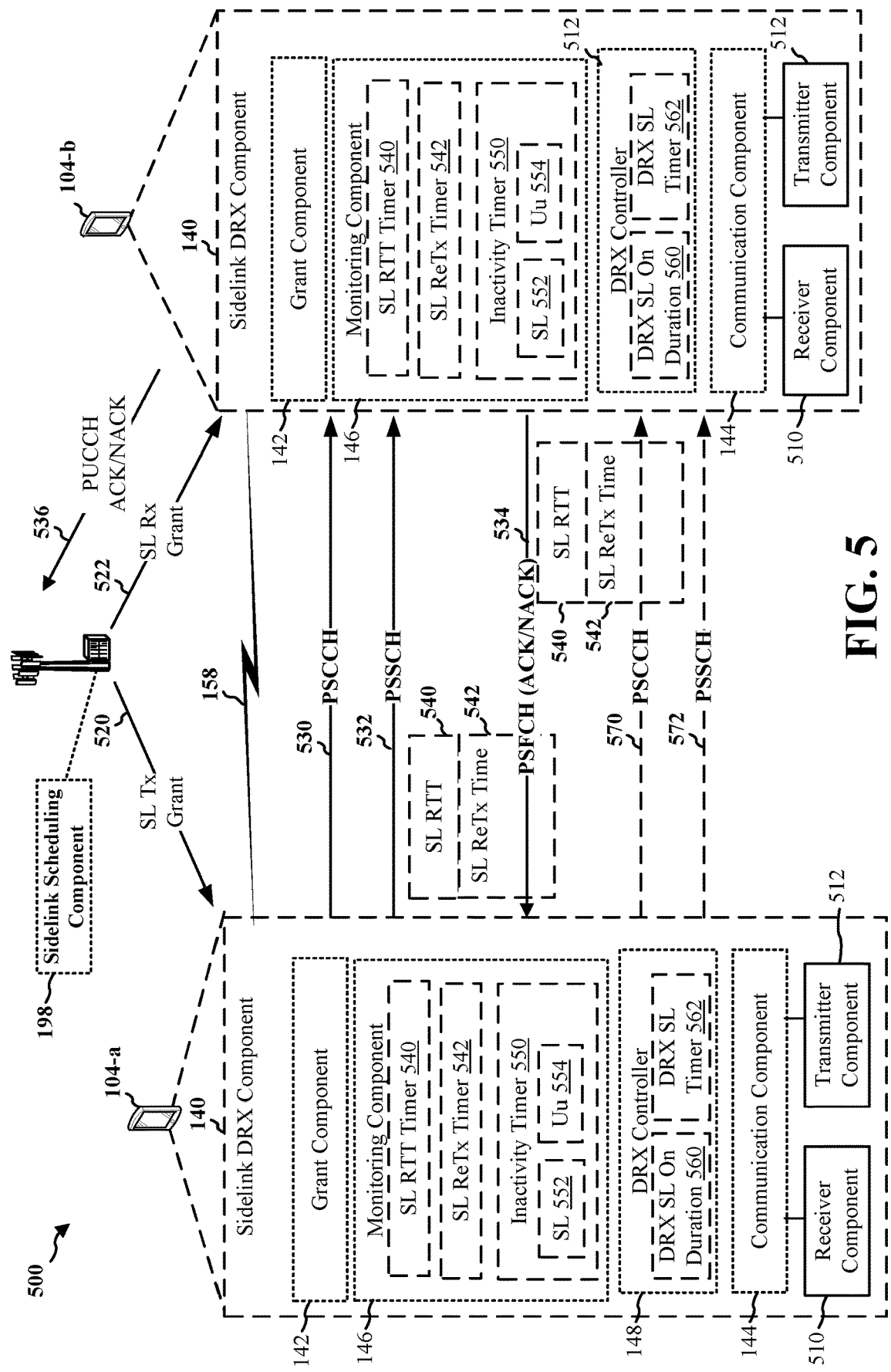
FIG. 5 is a diagram illustrating example communications and components of a base station, a first transmitting UE, and a second receiving UE for DRX operation with mode 1 scheduling.

FIG. 5 is a diagram 500 illustrating example communications and components of a base station 102 a first UE 104-a and a second UE 104-b. The UEs 104-a, 104-b may each include a sidelink DRX component 140. The first UE 104-a may be a sidelink transmitting UE and the second UE 104-b may be a sidelink receiving UE. As discussed above regarding FIG. 1, the first UE 104-a may include the grant component 142, the communication component 144, the monitoring component 146, and the DRX controller 148. The UE 104 may also include a receiver component 510 and a transmitter component 512. The receiver component 510 may include, for example, a RF receiver for receiving the signals described herein. The transmitter component 512 may include, for example, an RF transmitter for transmitting the signals described herein. In an aspect, the receiver component 510 and the transmitter component 512 may be implemented as a transceiver.

The base station 102 may include the sidelink scheduling component 198. The base station 102 may transmit a SL Tx grant 520 to the first UE 104-a and transmit a sidelink receive grant 522 to the second UE 104-b. For example, the grants 520, 522 may be downlink control information (DCI) carried on the PDCCH. The grant component 142 at each of the first UE 104-a and the second UE 104-b may receive the respective grant 520, 522 by monitoring the PDCCH.

The first UE 104-a and the second UE 104-b may communicate via the communication link 158, which may be referred to as a direct link or the sidelink. The communication component 144 of the first UE 104-a may transmit the PSCCH 530 via the transmitter component 512. The PSCCH 530 may include additional parameters for the sidelink transmission. The communication component 144 of the first UE 104-a may transmit the sidelink transmission via the transmitter component 512 as a PSSCH 532 according to the SL Tx grant 520 and the PSCCH 530. The communication component 144 of the second UE 104-b may receive the PSCCH 530 via the receiver component 510. The communication component 144 of the second UE 104-b may determine whether the PSCCH 530 was correctly received and transmit an ACK/NACK. For example, the second UE 104-b may transmit the ACK/NACK via either the PSFCH 534 to the first UE 104-a or a PUCCH 536 to the base station 102.

The monitoring component 146 may be configured with various timers or durations of time for determining whether the UE 104 is in a DRX mode and whether the UE 104 should monitor for a grant. The configured durations of time may be referred to as timers, but the monitoring component 146 may include other implementations for monitoring a duration of time. The monitoring component 146 may be configured with a SL RTT timer 540 and a SL ReTx timer 542 for monitoring retransmissions for a HARQ process. The SL RTT timer 540 and the SL ReTx timer 542 may be specific for the sidelink and may be different than the RTT timer 440 and the ReTx timer 442 for the Uu link. Additionally, the SL RTT timer 540 and the SL ReTx timer 542 may be specific for a direction of the transmission (e.g. transmit and receive). The SL RTT timer 540 and the SL ReTx timer 542 may be specific for a link with the second UE 104-b (and different for a link with a third UE). The SL RTT timer 540 and the SL ReTx timer 542 may be specific for a link type (e.g., unicast, groupcast, broadcast), a traffic type (e.g., QoS class), or for the first UE 104-a.

The monitoring component 146 may begin monitoring the SL RTT timer 540 for a HARQ process of a sidelink transmission from the UE 104-a in a symbol after the transmission (e.g., the PSSCH 532). For a sidelink reception, the second UE 104-b may begin monitoring the SL RTT timer 540 for the HARQ process after transmission of the ACK/NACK as either the PSFCH 534 or the PUCCH 536. In either case, the monitoring component 146 may begin monitoring the SL ReTx timer 542 in the symbol after the SL RTT timer 540 expires. Accordingly, the UE 104-a may monitor for either the PSFCH 534 and/or a SL Tx grant 520 indicating a retransmission during the SL ReTx timer 542. Similarly, the UE 104-b may monitor for a second PSCCH 570 and/or another SL Rx grant 522 for a retransmission during the SL ReTx timer 542. If a retransmission is scheduled, the transmitting UE 104-a may transmit a second PSSCH 572 and the UEs 104-a, 104-b may monitor the SL RTT timer 540 and the SL ReTx timer 542 again.

The monitoring component 146 may be configured with an inactivity timer 550 for monitoring a time since a last new transmission for the respective UE 104-a or 104-b. In an aspect, the inactivity timer 550 may be shared with the inactivity timer 432 for the Uu link. That is, a grant for either a Uu link transmission or a SL transmission may reset the inactivity timer 550 and/or the inactivity timer 432. The configured duration of the SL inactivity timer 552, however, may be different than a configured duration of the Uu inactivity timer 554. As with the SL RTT timer 540 and the SL ReTx timer 542, the configured duration of the SL inactivity timer 552 may be specific for a direction of transmission, a link with a second UE, a link type, a traffic type, or for the first UE. A new duration of the inactivity timer 550 or the inactivity timer 432 may depend on the link for the received grant. An example operation of this aspect is described with respect to FIG. 7. In another aspect, the configured duration of the SL inactivity timer 552 and the configured duration of the Uu inactivity timer 554 may be monitored separately. An example operation of this aspect is described with respect to FIG. 8.

The DRX controller 148 may determine whether the UE 104-a or 104-b is in a DRX mode in which the UE follows either a long or short DRX cycle including a DRX on duration and a DRX off portion during a DRX period. The DRX controller 148 may be configured with a DRX SL on duration 560 and a SL short DRX cycle 562, which may be different than either the long DRX cycle 410, the short DRX cycle 420, the long DRX on duration 412, or the short DRX on duration 422 for the Uu link.

The DRX controller 148 may control the receiver component 510 to monitor the PDCCH for grants during a SL active time, which may include any time when the SL ReTx timer 542, the inactivity timer 550, or the DRX SL on duration 560 is running. Additionally, the DRX controller 148 may implement Uu DRX cycle and control the receiver component 510 to monitor the PDCCH for grants during the Uu active time which may include any time the long DRX on duration 412, the short DRX on duration 422, the ReTx timer 442 (either UL or DL), the inactivity timer 432, or a contention resolution timer is running.

Figure 6:
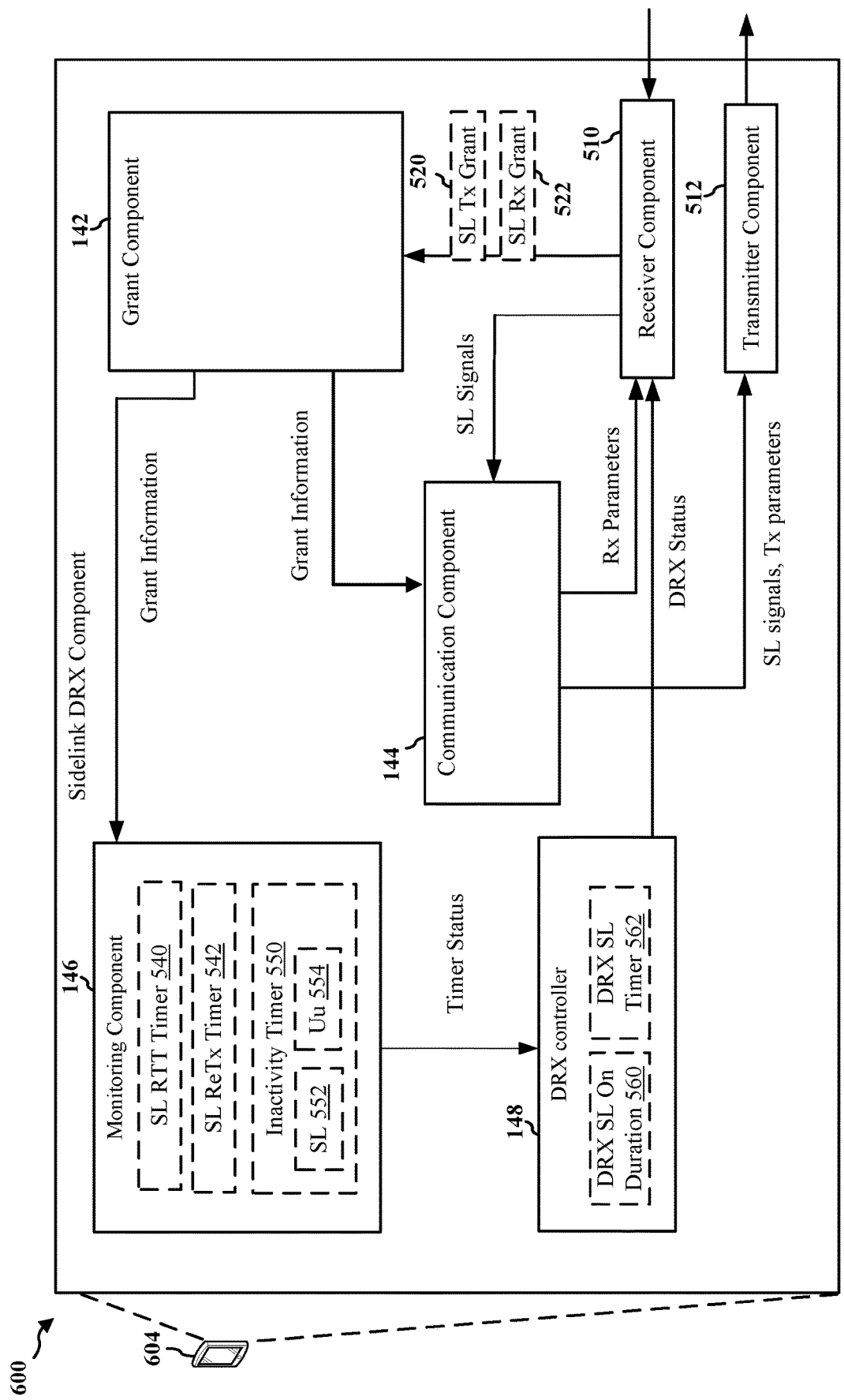
FIG. 6 is a conceptual data flow diagram illustrating the data flow between different means/components in an example UE for DRX operation with mode 1 scheduling.

FIG. 6 is a conceptual data flow diagram 600 illustrating the data flow between different means/components in an example UE 604, which may be an example of the UE 104 including the sidelink DRX component 140.

The receiver component 510 may receive downlink signals such as the SL Tx grant 520 and/or the SL Rx grant 522. The receiver component 510 may pass grants to the grant component 142. The receiver component 510 may receive sidelink signals such as PSCCH 530, PSSCH 532, and PSFCH 534. The receiver component 510 may pass the sidelink signals to the communication component 144.

The grant component 142 may receive the SL Tx grant 520 and the SL Rx grant 522 from the receiver component 510. The grant component 142 may decode a received grant and provide grant information (e.g., time domain and frequency domain resources) to the communication component 144 and the monitoring component 146.

The communication component 144 may control the receiver component 510 and the transmitter component 512 according to the received grants. For example, the communication component 144 may provide receive parameters to the receiver component 510 and provide sidelink signals and transmit parameters to the transmitter component 512.

The monitoring component 146 may receive the grant information from the grant component 142 and monitor at least the SL RTT timer 540 and the SL ReTx timer 542. The monitoring component 146 may also monitor the inactivity timer 550, either jointly for both the SL and Uu link, or separately for the SL inactivity timer 552 and the Uu inactivity timer 554. The monitoring component 146 may provide a timer status for each of the timers to the DRX controller 148.

The DRX controller 148 may receive the timer statuses from the monitoring component 146 and determine whether to allow the UE 104 to enter a DRX mode. When in the DRX mode, the DRX controller 148 may determine the SL short DRX cycle 562 and the DRX SL on duration 560. The DRX controller 148 may provide the receiver component 510 with a DRX status that indicates whether the receiver component 510 monitors the PDCCH for grants.

FIG. 7 is a timing diagram 700 of an example scenario with a joint inactivity timer 550 for both SL and Uu link. During a DRX on duration 560, the UE 104 may receive a grant (e.g., a SL Tx grant 520). The UE 104, sidelink DRX component 140, and/or monitoring component 146 may monitor a SL inactivity timer 552, for example, using an inactivity timer. During the SL inactivity timer 552, the UE 104 may continue to monitor the PDCCH and may receive a Uu grant 430. The UE 104, sidelink DRX component 140, and/or monitoring component 146 may reset the inactivity timer based on the configured Uu inactivity timer 554. That is, the UE 104, sidelink DRX component 140, and/or monitoring component 146 may determine a new duration for the inactivity timer 550.

As illustrated, the Uu inactivity timer 554 may be greater than the SL inactivity timer 552, so the new duration of the inactivity timer may be the configured Uu inactivity timer 554. During the Uu inactivity timer 554, the UE 104 may receive a second SL Tx grant 520. In this case, the SL inactivity timer 552 may be less than a remaining duration of the Uu inactivity timer 554. Accordingly, the UE 104, sidelink DRX component 140 and/or monitoring component 146 may continue to monitor the Uu inactivity timer 554. If no further grants are received during the Uu inactivity timer 554, the UE 104, sidelink DRX component 140 and/or DRX controller 148 may start the short DRX cycle 562.

FIG. 8 is a timing diagram 800 of an example scenario with separate inactivity timers 550 for both SL and Uu link. During a DRX SL on duration 560, the receiver component 510 may monitor a PDCCH search space configured for sidelink grants. The UE 104 may receive a grant (e.g., a SL Tx grant 520). In response to the SL Tx grant 520, the UE, sidelink DRX component 140 and/or monitoring component 146 may monitor a SL inactivity timer 552, for example. During the SL inactivity timer 552, the UE 104 may also be in a Uu on duration 422 and monitor a PDCCH search space for Uu grants. The UE 104 may receive a Uu grant 430. In this case, because the SL inactivity timer 552 and the Uu inactivity timer 554 are separate, the SL inactivity timer 552 may not be reset by the Uu grant 430. Instead, the SL inactivity timer 552 may expire if no additional sidelink grants are received, and the UE 104 may start a SL short DRX cycle 562. Upon receipt of the Uu grant 430, the UE 104 may start the Uu inactivity timer 554. If no additional Uu grants 430 are received before the end of the Uu inactivity timer 554, the UE 104 may start the Uu short DRX cycle 420. In this scenario, the UE 104 may reduce PDCCH decoding when one of the Uu link or SL is inactive.

Figure 9:
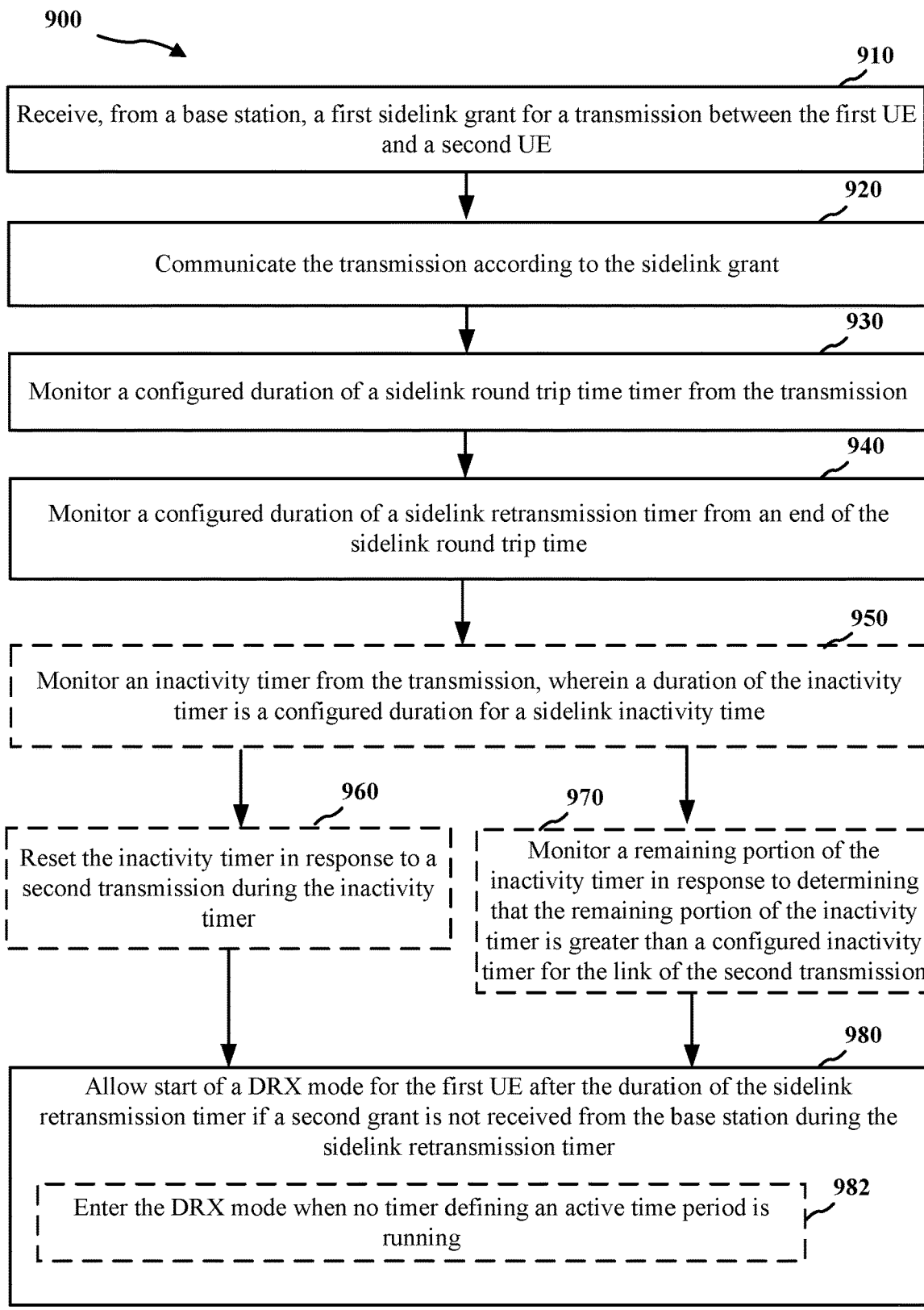
FIG. 9 is a flowchart of an example of a method of sidelink DRX operation for mode 1 scheduling for a UE.

FIG. 9 is a flowchart of an example method 900 for operating a UE 104 for sidelink DRX. The method 900 may be performed by a UE (such as the UE 104, which may include the memory 360 and which may be the entire UE 104 or a component of the UE 104 such as the sidelink DRX component 140, TX processor 368, the RX processor 356, or the controller/processor 359). The method 900 may be performed by the sidelink DRX component 140 in communication with the sidelink scheduling component 198 of the base station 102 and the sidelink DRX component 140 of another UE 104.

At block 910, the method 900 may include receiving, from a base station, a first sidelink grant for a transmission between the first UE and a second UE. In an aspect, for example, the UE 104, the TX processor 368 and/or the controller/processor 359 may execute the sidelink DRX component 140 and/or the grant component 142 to receive, from the base station 102, the first sidelink grant 520, 522 for a transmission (e.g., PSSCH 532) between the first UE 104-*a* and the second UE 104-*b*. Accordingly, the UE 104, the RX processor 356, and/or the controller/processor 359 executing the sidelink DRX component 140 and/or the grant component 142 may provide means for receiving, from a base station, a first sidelink grant for a transmission between the first UE and a second UE.

At block 920, the method 900 may optionally include communicating the transmission according to the sidelink grant. In an aspect, for example, the UE 104, the RX processor 356 and/or the controller/processor 359 may execute the sidelink DRX component 140 and/or the communication component 144 to communicate the transmission according to the sidelink grant 520, 522. For example, the communication component 144 may transmit the PSCCH 530 and the PSSCH 532 in response to a SL Tx grant 520. As another example, the communication component 144 may receive the PSCCH 530 and the PSSCH 532 in response to the SL Rx grant 522 and transmit the PSFCH 534 or PUCCH 536 in response to the PSSCH 532. Accordingly, the UE 104, the RX processor 356, the Tx processor 368, and/or the controller/processor 359 executing the sidelink DRX component 140 and/or the communication component 144 may provide means for communicating the transmission according to the sidelink grant.

At block 930, the method 900 may include monitoring a configured duration of a sidelink round trip time timer from the transmission. In an aspect, for example, the UE 104, the RX processor 356 and/or the controller/processor 359 may execute the sidelink DRX component 140 and/or the monitoring component 146 to monitor the configured duration of the SL RTT timer 540 from the transmission. For example, the monitoring component 146 may start a SL RTT timer in the symbol after the PSSCH 532 for a transmitting UE 104-*a*, or the symbol after the PSFCH 534 or the PUCCH 536 for the receiving UE 104-*b*. Accordingly, the UE 104, the RX processor 356, and/or the controller/processor 359 executing the sidelink DRX component 140 and/or the monitoring component 146 may provide means for monitoring a configured duration of a sidelink round trip time timer from the transmission.

At block 940, the method 900 may include monitoring a configured duration of a sidelink retransmission timer from an end of the sidelink round trip time timer. In an aspect, for example, the UE 104, the RX processor 356 and/or the controller/processor 359 may execute the sidelink DRX component 140 and/or the monitoring component 146 to monitor the configured duration of the SL ReTx timer 542 from an end of the SL RTT timer 540. For example, the monitoring component 146 may start a SL ReTX timer in the symbol after the SL RTT t540 expires. Accordingly, the UE 104, the RX processor 356, and/or the controller/processor 359 executing the sidelink DRX component 140 and/or the monitoring component 146 may provide means for monitoring a configured duration of a sidelink retransmission timer from an end of the sidelink round trip time timer.

At block 950, the method 900 may optionally include monitoring an inactivity timer from the sidelink grant. A duration of the inactivity timer may be a configured duration for a sidelink inactivity timer. In an aspect, for example, the UE 104, the RX processor 356, and/or the controller/processor 359 may execute the sidelink DRX component 140 and/or the monitoring component 146 to monitor the inactivity timer 550 from the sidelink grant 520, 522. The duration of the inactivity timer 550 may be a configured duration for a SL inactivity timer 552. Accordingly, the UE 104, the RX processor 356, and/or the controller/processor 359 executing the sidelink DRX component 140 and/or the monitoring component 146 may provide means for monitoring an inactivity timer from the sidelink grant.

At block 960, the method 900 may optionally include resetting the inactivity timer in response to a second grant for a second transmission during the inactivity timer. In an aspect, for example, the UE 104, the RX processor 356, and/or the controller/processor 359 may execute the sidelink DRX component 140 and/or the monitoring component 146 to reset the inactivity timer 550 in response to a second grant for a second transmission during the inactivity timer. For example, as illustrated in FIG. 7, the Uu grant 430 may be a second grant for a second transmission, and the inactivity timer 550 may be reset based on the configured inactivity timer for the Uu link. Accordingly, the UE 104, the RX processor 356, and/or the controller/processor 359 executing the sidelink DRX component 140 and/or the monitoring component 146 may provide means for resetting the inactivity timer in response to a second sidelink grant during the inactivity timer.

At block 970, the method 900 may optionally include monitoring a remaining portion of the inactivity timer in response to determining that the remaining portion of the inactivity timer is greater than a configured inactivity timer for the link of the second transmission. In an aspect, for example, the UE 104, the RX processor 356 and/or the controller/processor 359 may execute the sidelink DRX component 140 and/or the monitoring component 146 to monitor a remaining portion of the inactivity timer in response to determining that the remaining portion of the inactivity timer is greater than a configured inactivity timer for the link of the second sidelink grant. The monitoring component 146 may monitor the maximum of the remaining portion of a current inactivity timer or a duration of a new activity timer for the link of the second sidelink grant. For example, as illustrated in FIG. 7, the remaining portion of the Uu inactivity timer 554 when the second sidelink grant 520 is received may be greater than the configured SL inactivity timer 552. Accordingly, the monitoring component 146 may continue to monitor the Uu inactivity timer 554. Conversely, if the remaining portion of the Uu inactivity timer 554 were less than the configured SL inactivity timer 552, the monitoring component 146 may start a new activity timer for the configured SL inactivity timer 552. Further, the current inactivity timer may be based on the SL inactivity timer 552 when a grant for the Uu link is received, in which case, the monitoring component 146 may monitor the maximum of the remaining inactivity timer or the Uu inactivity timer 554. Therefore, the UE 104, the RX processor 356, and/or the controller/processor 359 executing the sidelink DRX component 140 and/or the monitoring component 146 may provide means for monitoring a remaining portion of the inactivity timer in response to determining that the remaining portion of the inactivity timer is greater than a configured inactivity timer for the link of the second transmission.

At block 980, the method 900 may include allowing start of a DRX mode after the duration of the sidelink retransmission timer if a second grant is not received during the sidelink retransmission timer. In an aspect, for example, the UE 104, the RX processor 356 and/or the controller/processor 359 may execute the sidelink DRX component 140 and/or the DRX controller 148 to allow start of the DRX mode (e.g., SL short DRX cycle 562) after the duration of the sidelink retransmission timer if a second grant is not received during the sidelink retransmission timer. Optionally, the block 980 may also be in response to the expiration of the inactivity timer 550. That is, the DRX controller 148 may allow start of the DRX mode when both the SL ReTx timer 542 and the inactivity timer 550 have expired. For example, at sub-block 982, the block 980 may include entering the DRX mode when no timer defining an active time period is running. Accordingly, the UE 104, the RX processor 356, and/or the controller/processor 359 executing the sidelink DRX component 140 and/or the DRX controller 148 may provide means for allowing start of the DRX mode after the duration of the sidelink retransmission timer if a second grant is not received during the sidelink retransmission timer.

Figure 10:
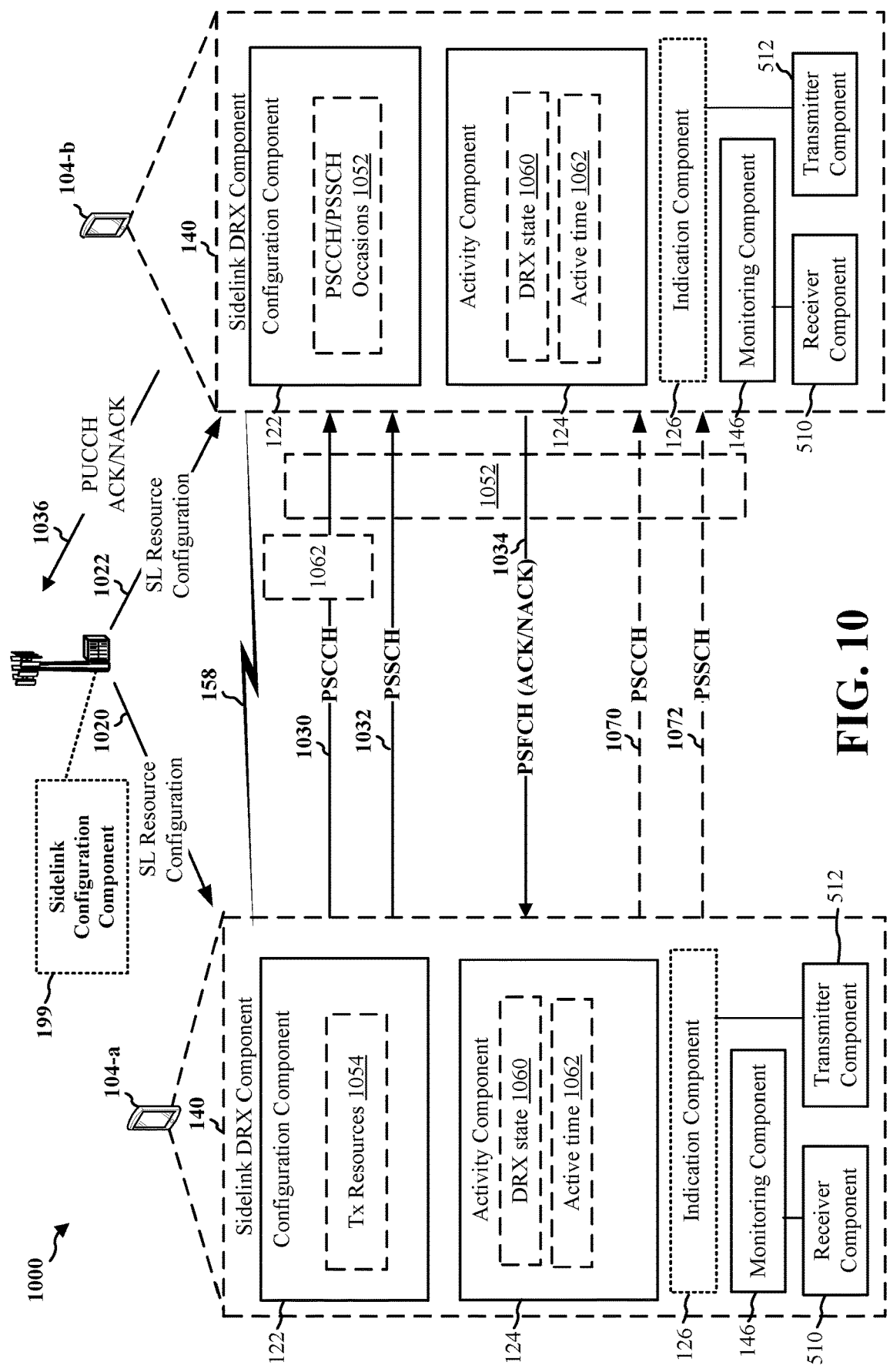
FIG. 10 is a diagram illustrating example communications and components of a base station, a first transmitting UE, and a second receiving UE for DRX operation with mode 2 scheduling.

FIG. 10 is a diagram 1000 illustrating example communications and components of a base station 102, a first UE 104-*a*, and a second UE 104-*b*. The UEs 104-*a*, 104-*b* may each include a sidelink DRX component 140. The first UE 104-*a* may be a sidelink transmitting UE and the second UE 104-*b* may be a sidelink receiving UE. As discussed above regarding FIG. 1, the first UE 104-*a* and the second UE 104-*b* may each include the configuration component 122, the activity component 124, the monitoring component 146, and the indication component 126. The UE 104-*a* may also include the receiver component 510 and the transmitter component 512 discussed above regarding FIG. 5.

The base station 102 may include the sidelink configuration component 199. The base station 102 may transmit a SL resource configuration 1020 to the first UE 104-*a* and transmit sidelink resource configuration 1022 to the second UE 104-*b*. For example, the sidelink resource configuration 1020, 1022 may be RRC messages. The configuration component 122 at each of the first UE 104-*a* and the second UE 104-*b* may receive the respective sidelink resource configuration 1020, 1022 via the PDSCH. The sidelink resource configuration 1020 may indicate Tx resources 1054 on which the UE 104-*a* may transmit on the PSCCH. The sidelink resource configuration 1022 may indicate PSCCH/PSSCH occasions 1052 for monitoring the PSCCH 1030. The PSCCH/PSSCH occasions 1052 for the UE 104-*b* may correspond to the Tx resources 1054 for the UE 104-*a*. That is, the UE 104-*b* may receive the PSCCH 1030 during one of the PSCCH/PSSCH occasions 1052 and then receive the scheduled PSSCH during the same PSCCH/PSSCH occasion 1052.

The activity component 124 of each of the first UE 104-*a* and the second UE 104-*b* may determine a DRX state 1060 for the respective UE 104. The DRX state 1060 may be either DRX active state 450 or a DRX inactive state 452 based on the respective Uu link with the base station 102. For example, the activity component 124 may determine the DRX state 1060 based on the Uu RTT timer 440, the Uu ReTx timer 442, and the UU inactivity timer 432 as discussed above with respect to FIG. 4.

The first UE 104-*a* and the second UE 104-*b* may communicate via the communication link 158, which may be referred to as a direct link or the sidelink. The transmitter component 512 of the first UE 104-*a* may transmit the PSCCH 1030 using configured Tx resources 1054. In an aspect, the activity component 124 may control whether to transmit the PSCCH 1030 on the configured Tx resources 1054 based on the DRX state 1060 (e.g., active state 450 or inactive state 452). In another aspect, the transmitter component 512 may always transmit on the configured Tx resources 1054, which may be considered active time for the sidelink. At the second UE 104-*b*, the activity component 124 may identify an active time 1062 based on the DRX mode for the Uu link with the base station 102 (e.g., as described above with respect to FIG. 4). For example the active time 1062 may be when the DRX state 1060 is active. In another aspect, the active time 1062 may include the PSCCH/PSSCH occasions 1052. The activity component 124 may control the monitoring component 146 to monitor the PSCCH 1030 during one or more of the PSCCH/PSSCH occasions 1052 that coincide with the active time 1062.

The transmitter component 512 of the first UE 104-*a* may transmit the sidelink transmission as a PSSCH 1032 according to the PSCCH 1030. The monitoring component 146 of the second UE 104-*b* may receive the PSCCH 1030 via the receiver component 510. The monitoring component 146 of the second UE 104-*b* may determine whether the PSCCH 1030 was correctly received and transmit an ACK/NACK. For example, the second UE 104-*b* may transmit the ACK/NACK via either the PSFCH 1034 to the first UE 104-*a* or a PUCCH 1036 to the base station 102. The UE 104-*a* or the activity component 124 may monitor the PSFCH 1034. The UE 104-*a* or the transmitter component 512 may transmit a second PSCCH 1070 in response to a NACK on the PSFCH 1034. The UE 104-*b* or monitoring component 146 may monitor for the PSCCH 1070 during the PSCCH/PSSCH occasions 1052. The UE 104-*a* or the transmitter component 512 may transmit a second PSSCH 1072 based on the PSCCH 1070.

Figure 11:
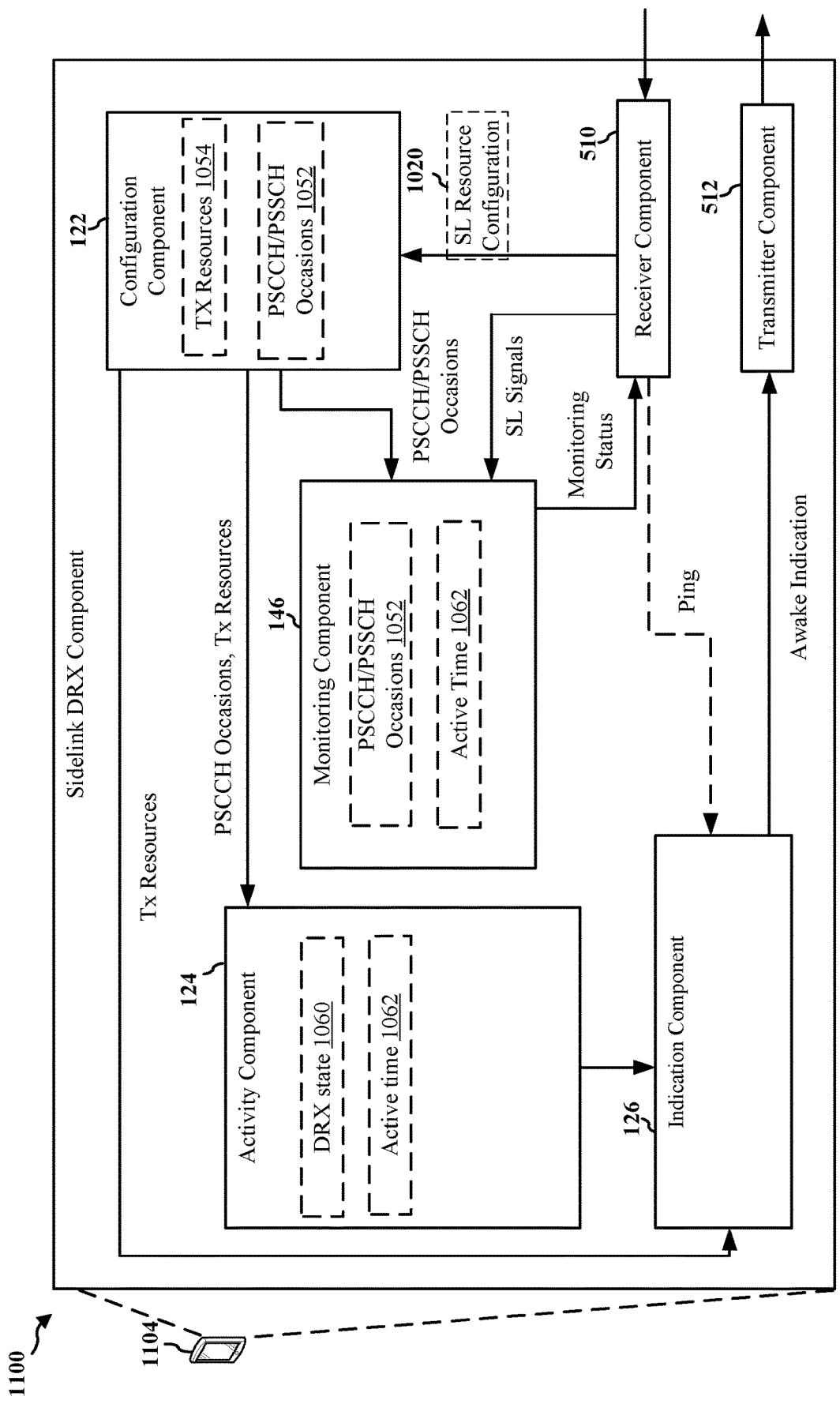
FIG. 11 is a conceptual data flow diagram illustrating the data flow between different means/components in an example UE for DRX operation with mode 2 scheduling.

FIG. 11 is a conceptual data flow diagram 1100 illustrating the data flow between different means/components in an example UE 104, which may be an example of the UE 104 including the sidelink DRX component 140.

The receiver component 510 may receive downlink signals such as the SL resource configuration 1020, which may be, for example, an RRC configuration message. The receiver component 510 may pass the SL resource configuration 1020 to the configuration component 122. The receiver component 510 may receive sidelink signals such as PSCCH 1030, PSSCH 1032, and PSFCH 1034. The receiver component 510 may pass the sidelink signals to the monitoring component 146.

The configuration component 122 may receive the SL resource configuration 1020 from the receiver component 510. The configuration component 122 may decode the SL resource configuration 1020 to determine the PSCCH/PSSCH occasions 1052 and the TX resource 1054. The configuration component 122 may provide the PSCCH/PSSCH occasions 1052 to the monitoring component 146 and the activity component 124. The configuration component 122 may provide the TX resource 1054 to the activity component 124, the indication component 126, and the transmitter component 512.

The activity component 124 may identify an active time for the UE 1104 and control the receiver component 510, the transmitter component 512, and the monitoring component 146 according to the active time 1062. For example, the activity component 124 may identify the active time 1062 based on the Uu link as described above regarding FIG. 4. The activity component 124 may provide the active time to the monitoring component 146.

The monitoring component 146 may receive the PSCCH/PSSCH occasions 1052 from the configuration component and the active time 1062 from the activity component 124. The monitoring component 146 may determine whether to monitor the SL signals such as the PSCCH based on the PSCCH/PSSCH occasions 1052 and the active time 1062. In particular, the monitoring component 146 may monitor the PSCCH 1030 during one or more of the PSCCH/PSSCH occasions 1052 that coincide with the active time 1062. The monitoring component 146 may provide a monitoring status to the receiver component 510 that indicates whether the receiver component 510 is to provide the SL signals or sleep.

The indication component 126 may receive the active time 1062 from the activity component 124. The indication component 126 may transmit an awake indication to the second UE via the transmitter component 512 in response to the active time 1062 indicating that the Uu link is active. In an aspect, the indication component 126 may receive a ping from the second UE via the receiver component 510. The indication component 126 may provide the awake indication to the second UE via the receiver component 510 in response to the ping when the Uu link is active. Accordingly, the second UE may identify when the UE 1104 is active, and transmit a PSCCH during a PSCCH occasion corresponding to the active time 1062.

Figure 12:
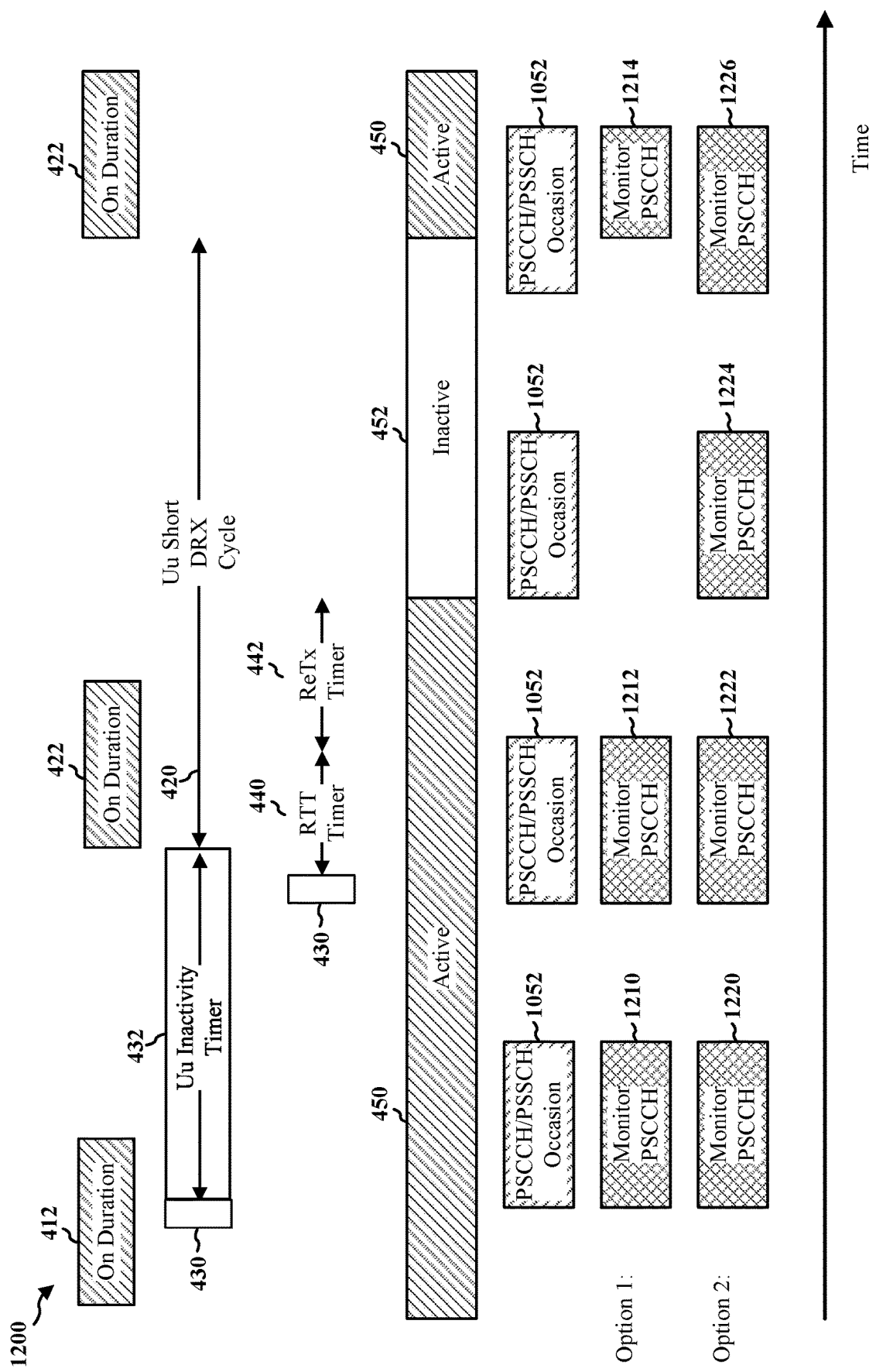
FIG. 12 is a timing diagram of an example of sidelink DRX operation for mode 2 scheduling.

FIG. 12 is a timing diagram 1200 of an example scenario for monitoring a PSCCH based on a DRX mode for a Uu link with a base station. The DRX mode for the Uu link may be similar to described above with respect to FIG. 4. During an on duration 412 (for either long DRX cycle or short DRX cycle), the UE 104 may receive a grant 430 for a new transmission. The activity component 124 may start the inactivity timer 432 in response to the grant 430. When the inactivity timer 432 stops, the activity component 124 may enter a short DRX cycle 420 including an on duration 422. During the inactivity timer 432, the UE 104 may receive a second grant 430 for a retransmission. The activity component 124 may start the RTT timer 440 in response to the second grant 430 and start the ReTx timer 442 when the RTT timer 440 ends.

The activity component 124 may identify the active time 1062 based on the active time for the Uu link. The activity component 124 may identify active time whenever an on duration 412, 422, the inactivity timer 432, or the ReTx timer 442 is running. The activity component 124 may identify an active state 450 from the first on duration 412 until the end of the ReTx timer 442. Although a portion of the ReTx timer 442 is within the off portion of the short DRX cycle 420, the UE 104 may monitor for the retransmission during the ReTx timer 442, so that portion may be considered active state 450. The UE 104 may be in inactive state 452 for a remaining portion of the short DRX cycle 420 and resume active state 450 during the next on duration 422.

The PSCCH/PSSCH occasions 1052 may occur periodically based on the sidelink resource configuration. The monitoring component 146 may monitor the PSCCH 1030 during one or more of the PSCCH/PSSCH occasions 1052 that coincide with the active time. The PSCCH/PSSCH occasions 1052 that coincide with the active time may at least partially overlap in time with the active state 450. In a first option, the monitoring component 146 may monitor the PSCCH 1030 during the portions of the PSCCH/PSSCH occasions 1052 that overlap the active time 1062 (e.g., active state 450). Accordingly, the monitoring component 146 may monitor the PSCCH during occasions 1210 and 1212. A PSCCH/PSSCH occasion 1052 may partially overlap the active state 450 during monitoring occasion 1214 and the monitoring component 146 may monitor the PSCCH during the concurrent portion (i.e., the portion of the PSCCH/PSSCH occasion 1052 when the UE is in the active state 450). In a second option, the monitoring component 146 may monitor the PSCCH during any PSCCH/PSSCH occasion 1052. That is, in the second option, all of the PSCCH/PSSCH occasions 1052 may coincide with the active time. For example, the PSCCH/PSSCH occasions 1052 may be considered part of active time 1062, or the monitoring component 146 may determine PSCCH/PSSCH occasions 1220, 1222, 1224, 1226 independently of the Uu DRX mode.

Figure 13:
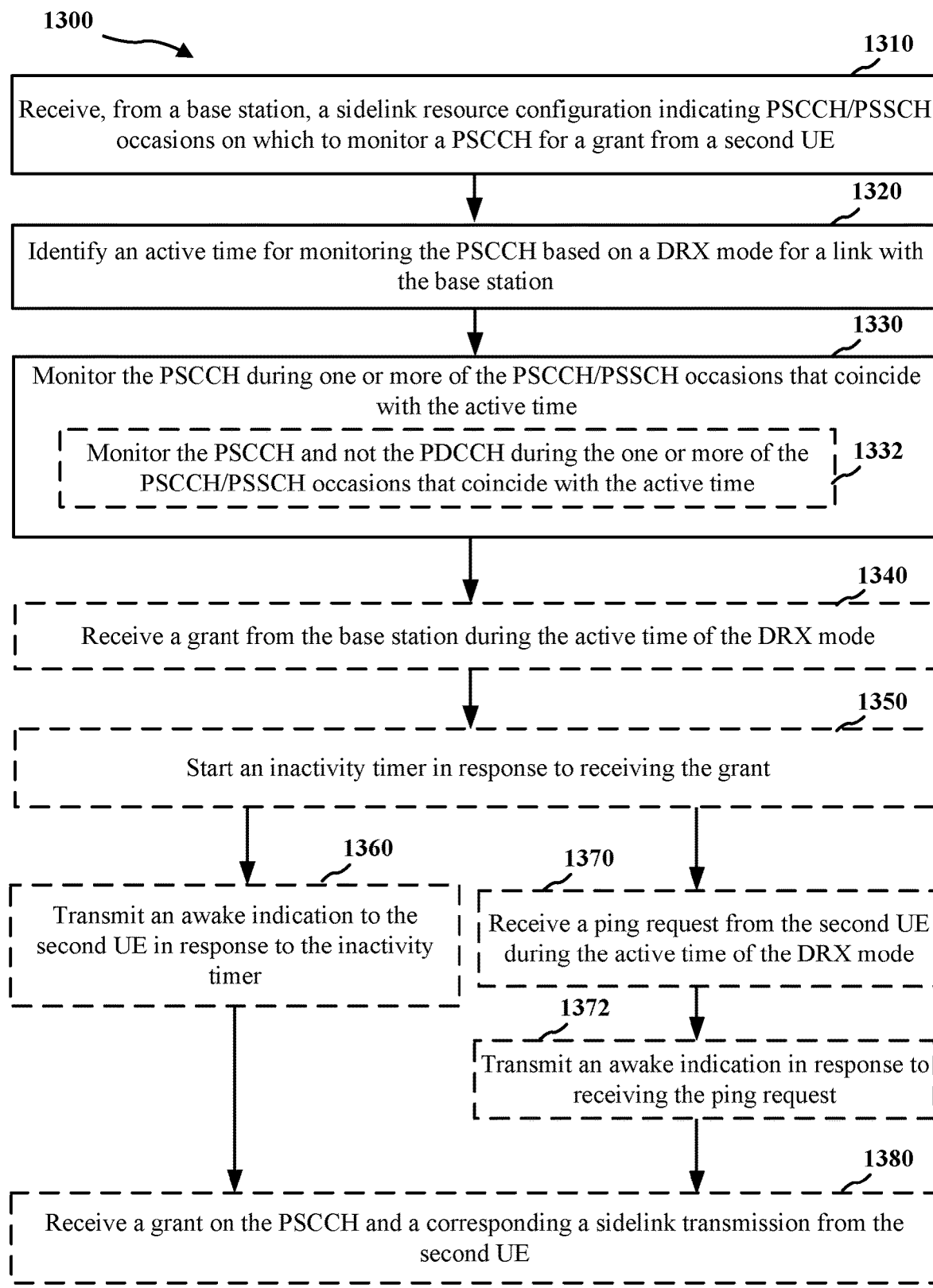
FIG. 13 is a flowchart of an example of a method of receiving a sidelink transmission in a DRX operation with mode 2 scheduling.

FIG. 13 is a flowchart of an example method 1300 for operating a UE 104 for sidelink DRX using mode 2 scheduling. The method 1300 may be performed by a UE (such as the UE 104, which may include the memory 360 and which may be the entire UE 104 or a component of the UE 104 such as the sidelink DRX component 140, TX processor 368, the RX processor 356, or the controller/processor 359). The method 1300 may be performed by the sidelink DRX component 140 in communication with the sidelink configuration component 199 of the base station 102 and the sidelink DRX component 140 of another UE 104.

At block 1310, the method 1300 may include receiving, from a base station, a sidelink resource configuration indicating PSCCH/PSSCH occasions on which to monitor a PSCCH for a grant from a second UE. In an aspect, for example, the UE 104, the TX processor 368 and/or the controller/processor 359 may execute the sidelink DRX component 140 and/or the configuration component 122 to receive, from the base station 102, a sidelink resource configuration 1020 indicating PSCCH/PSSCH occasions 1052 on which to monitor the PSCCH 1030 for a grant from a second UE 104. Accordingly, the UE 104, the RX processor 356, and/or the controller/processor 359 executing the sidelink DRX component 140 and/or the configuration component 122 may provide means for receiving, from a base station, a sidelink resource configuration indicating PSCCH/PSSCH occasions on which to monitor a PSCCH for a grant from a second UE.

At block 1320, the method 1300 may include identifying an active time for monitoring the PSCCH based on a DRX mode for a link with the base station. In an aspect, for example, the UE 104, the RX processor 356 and/or the controller/processor 359 may execute the sidelink DRX component 140 and/or the activity component 124 to identify an active time for monitoring the PSCCH based on a DRX mode for a link with the base station. For example, the activity component 124 may identify the active time 1062 as discussed above regarding FIG. 4 and FIG. 11. Accordingly, the UE 104, the RX processor 356, the Tx processor 368, and/or the controller/processor 359 executing the sidelink DRX component 140 and/or the activity component 124 may provide means for identifying an active time for monitoring the PSCCH based on a DRX mode for a link with the base station.

At block 1330, the method 1300 may include monitoring the PSCCH during one or more of the PSCCH/PSSCH occasions that coincide with the active time. In an aspect, for example, the UE 104, the RX processor 356 and/or the controller/processor 359 may execute the sidelink DRX component 140 and/or the monitoring component 146 to monitor the PSCCH 1030 during one or more of the PSCCH/PSSCH occasions 1052 that coincide with the active time 1062. In an aspect, where the UE 104 is not capable of receiving over both the sidelink and the link with the base station concurrently, at sub-block 1332, the block 1330 may include monitoring the PSCCH and not the PDCCH during the one or more of the PSCCH/PSSCH occasions that coincide with the active time. Accordingly, the UE 104, the RX processor 356, and/or the controller/processor 359 executing the sidelink DRX component 140 and/or the monitoring component 146 may provide means for monitoring the PSCCH during one or more of the PSCCH/PSSCH occasions that coincide with the active time.

At block 1340, the method 1300 may optionally include receiving a grant from the base station during the active time of the DRX mode. In an aspect, for example, the UE 104, the RX processor 356 and/or the controller/processor 359 may execute the sidelink DRX component 140 and/or the receiver component 510 to receive a grant 430 from the base station during the active time of the DRX mode. For example, the receiver component 510 may receive a PDCCH including a DCI for the UE 104 (e.g., having a CRC scrambled with a RNTI for the UE). The grant 430 may schedule a transmission on the Uu link. Accordingly, the UE 104, the RX processor 356, and/or the controller/processor 359 executing the sidelink DRX component 140 and/or the receiver component 510 may provide means for receiving a grant from the base station during the active time of the DRX mode.

At block 1350, the method 1300 may optionally include starting an inactivity timer in response to receiving the grant. In an aspect, for example, the UE 104, the RX processor 356, and/or the controller/processor 359 may execute the sidelink DRX component 140 and/or the activity component 124 to start an inactivity timer 432 in response to receiving the grant 430. The duration of the inactivity timer 432 may be considered active time. Accordingly, the UE 104, the RX processor 356, and/or the controller/processor 359 executing the sidelink DRX component 140 and/or the activity component 124 may provide means for starting an inactivity timer in response to receiving the grant.

At block 1360, the method 1300 may optionally include transmitting an indication that the UE is active during the inactivity timer to the second UE. In an aspect, for example, the UE 104, the TX processor 368, and/or the controller/processor 359 may execute the sidelink DRX component 140 and/or the indication component 126 to transmit an indication that the UE 104 is active during the inactivity timer 432 to the second UE (e.g., UE 104-*a*) or to the base station 102. The inactivity timer 432 may result in additional active time 1062 that may be used for sidelink transmissions. By sending the indication, the first UE 104 may inform the second UE 104-*a* that the UE 104-*b* is monitoring a next PSCCH/PSSCH occasion 1052. Accordingly, the UE 104, the TX processor 368, and/or the controller/processor 359 executing the sidelink DRX component 140 and/or the monitoring component 146 may provide means for transmitting an indication that the UE is active during the inactivity timer to the second UE or to the base station.

At block 1370, the method 1300 may optionally include receiving a ping request from one of the base station or the second UE during the active time of the DRX mode. In an aspect, for example, the UE 104, the RX processor 356 and/or the controller/processor 359 may execute the sidelink DRX component 140 and/or the monitoring component 146 to receive the ping request from one of the base station or the second UE during the active time 1062. For example, the ping request may be a SCI transmitted on the PSCCH or a DCI transmitted on the PDCCH. A ping request from the base station may originate from the second UE, for example, by the second UE transmitting a ping request to the base station. The ping request may only be received when the UE 104 is active (e.g., monitoring PSCCH). The ping request may schedule enough resources for an acknowledgment without reserving resources for a large amount of data in case the UE 104 is asleep. Accordingly, the UE 104, the RX processor 356, and/or the controller/processor 359 executing the sidelink DRX component 140 and/or the monitoring component 146 may provide means for receiving a ping request from one of the base station or the second UE during the active time.

At block 1372, the method 1300 may optionally include transmitting an awake indication in response to receiving the ping request. The block 1372 may be similar to the block 1360, except in response to the ping request instead of in response to the inactivity timer.

At block 1380, the method 1300 may optionally include receiving a grant on the PSCCH and a corresponding a sidelink transmission from the second UE. In an aspect, for example, the UE 104, the RX processor 356 and/or the controller/processor 359 may execute the sidelink DRX component 140 and/or the monitoring component 146 to receive a grant on the PSCCH 530 and a corresponding a sidelink transmission (e.g., PSSCH 1032) from the second UE. Accordingly, the UE 104, the RX processor 356, and/or the controller/processor 359 executing the sidelink DRX component 140 and/or the monitoring component 146 may provide means for receiving a grant on the PSCCH and a corresponding a sidelink transmission from the second UE.

Figure 14:
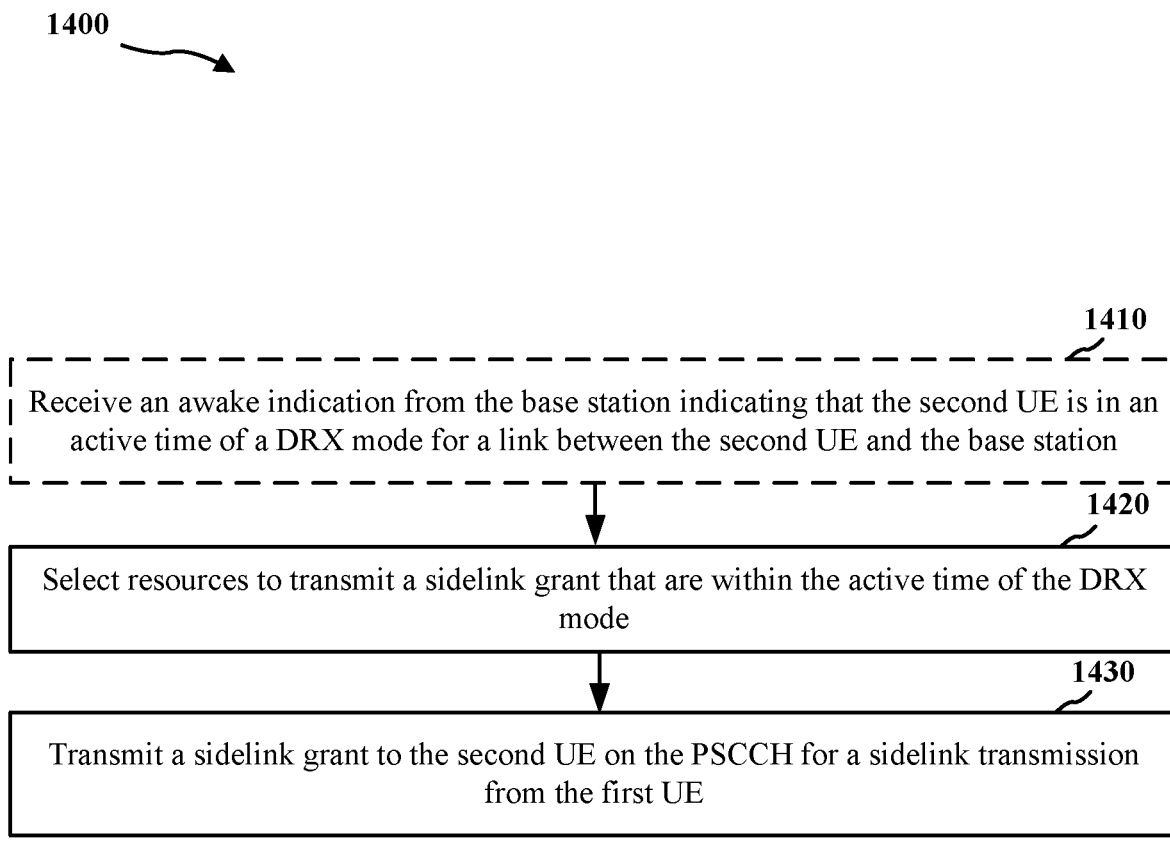
FIG. 14 is a flowchart of an example of a method of transmitting a sidelink transmission in a DRX operation with mode 2 scheduling.

FIG. 14 is a flowchart of an example method 1400 for operating a UE 104 for transmitting with sidelink DRX using mode 2 scheduling. The method 1400 may be performed by a UE (such as the UE 104, which may include the memory 360 and which may be the entire UE 104 or a component of the UE 104 such as the sidelink DRX component 140, TX processor 368, the RX processor 356, or the controller/processor 359). The method 1400 may be performed by the sidelink DRX component 140 in communication with the sidelink configuration component 199 of the base station 102 and the sidelink DRX component 140 of another UE 104. The method 1400 may be performed concurrently with the method 1300.

In block 1410, the method 1400 may optionally include receiving an awake indication from the base station or the second UE indicating that the second UE is in an active time of a DRX mode for a link between the second UE and the base station. In an aspect, for example, the UE 104, the RX processor 356, and/or the controller/processor 359 may execute the sidelink DRX component 140 and/or the receiver component 510 to receive an awake indication from the base station 102 or the second UE 104-*a* indicating that the second UE 104-*a* is in an active time of a DRX mode for a link between the second UE and the base station. Accordingly, the UE 104, the TX processor 368, and/or the controller/processor 359 executing the sidelink DRX component 140 and/or the transmitter component 512 may provide means for receiving an awake indication from the base station or the second UE indicating that the second UE is in an active time of a DRX mode for a link between the second UE and the base station.

In block 1420, the method 1400 may include selecting resources to transmit a sidelink grant that are within the active time of the DRX mode. In an aspect, for example, the UE 104, the TX processor 368, and/or the controller/processor 359 may execute the sidelink DRX component 140 and/or the activity component 124 to select resources to transmit the sidelink grant that are within the active time 1062 of the DRX mode. In an aspect, the block 1420 may be in response to the awake indication received in block 1410. For example, the activity component 124 may compare the Tx resources 1054 with the active time 1062 to select resources that are within the active time 1062. Alternatively, the Tx resources 1054 may be considered to be within the active time 1062 such that selection of any of the Tx resources 1054 may be within the active time 1062. In an aspect, the first UE may sleep on the resources for transmitting on the PSCCH if the first UE has no data to transmit. In an aspect, the SL resource configuration 1020 may specify the resources for transmitting on the PSCCH at a mini-slot level. A portion of a slot including the resources for transmitting may include resources on which to monitor the PSCCH. The second UE 104 may perform block 1330 of the method 1300 on the resources on which to monitor the PSCCH. Accordingly, the UE 104, the TX processor 368, and/or the controller/processor 359 executing the sidelink DRX component 140 and/or the transmitter component 512 may provide means for selecting resources to transmit a sidelink grant that are within the active time of the DRX mode.

In block 1430, the method 1400 may include transmitting the sidelink grant to the second UE on the PSCCH for a sidelink transmission from the first UE. In an aspect, for example, the UE 104, the TX processor 368, and/or the controller/processor 359 may execute the sidelink DRX component 140 and/or the transmitter component 512 to transmit the sidelink grant to the second UE (e.g., UE 104-*a*) on the PSCCH for a sidelink transmission from the first UE. Accordingly, the UE 104, the TX processor 368, and/or the controller/processor 359 executing the sidelink DRX component 140 and/or the transmitter component 512 may provide means for transmitting the sidelink grant to the second UE on the PSCCH for a sidelink transmission from the first UE.

Some Further Example Clauses

Implementation examples are described in the following numbered clauses, where clauses 1-44 relate to mode 1 scheduling and clauses 45-88 relate to mode 2 scheduling:

1. A method of wireless communication for a first user equipment (UE), comprising:

receiving, from a base station, a first sidelink grant for a transmission between the first UE and a second UE;

communicating the transmission according to the first sidelink grant;

monitoring a configured duration of a sidelink round trip time timer from the transmission;

monitoring a configured duration of a sidelink retransmission timer from an end of the sidelink round trip time timer; and allowing start of a discontinuous reception (DRX) mode for the first UE after the configured duration of the sidelink retransmission timer if a second grant is not received from the base station during the sidelink retransmission timer.

2. The method of clause 1, further comprising monitoring an inactivity timer from the first sidelink grant, wherein a duration of the inactivity timer is a configured duration for a sidelink inactivity timer, wherein allowing start of the DRX mode is also in response to expiration of the inactivity timer.

3. The method of clause 2, further comprising resetting the inactivity timer in response to a second grant for a second transmission during the inactivity timer, wherein a new duration of the inactivity timer is one of the configured duration for the sidelink inactivity timer or a configured duration for an inactivity timer for a link between the first UE and the base station, wherein the new duration is based on a link of the second transmission.

4. The method of clause 3, wherein the configured duration of the sidelink inactivity timer is different than the configured duration of the inactivity timer for the link between the first UE and the base station, further comprising monitoring a remaining portion of the inactivity timer in response to determining that the remaining portion of the inactivity timer is greater than a configured inactivity timer for the link of the second transmission.

5. The method of any of clauses 2-4, wherein the inactivity timer is specific for a sidelink and is not reset in response to a grant for a link between the first UE and the base station.

6. The method of any of clauses 1-5, wherein the configured duration of the sidelink round trip time timer and the configured duration of the sidelink retransmission timer are specific for a direction of the transmission.

7. The method of any of clauses 1-6, wherein the configured duration of the sidelink round trip time timer and the configured duration of the sidelink retransmission timer are specific for a link with the second UE.

8. The method of any of clauses 1-7, wherein the configured duration of the sidelink round trip time timer and the configured duration of the sidelink retransmission timer are specific for a link type, a traffic type, or for the first UE.

9. The method of any of clauses 1-8, wherein the DRX mode includes an on duration in which the first UE monitors for grants and an off duration in which the first UE does not monitor for grants.

10. The method of any of clauses 1-9, wherein allowing start of the DRX mode includes entering the DRX mode when no timer defining an active time period is running.

11. The method of any of clauses 1-10, wherein the DRX mode is defined by a set of parameters including a short cycle duration and a short cycle timer that are specific for a sidelink.

12. An apparatus for wireless communication for a first user equipment (UE), comprising:

a memory storing computer-executable instructions; and at least one processor coupled to the memory and configured to execute the computer-executable instructions to:

receive, from a base station, a first sidelink grant for a transmission between the first UE and a second UE;

communicate the transmission according to the first sidelink grant;

monitor a configured duration of a sidelink round trip time timer from the transmission;

monitor a configured duration of a sidelink retransmission timer from an end of the sidelink round trip time timer; and allow start of a discontinuous reception (DRX) mode for the first UE after the configured duration of the sidelink retransmission timer if a second grant is not received from the base station during the sidelink retransmission timer.

13. The apparatus of clause 12, wherein the at least one processor is configured to monitor an inactivity timer from the first sidelink grant, wherein a duration of the inactivity timer is a configured duration for a sidelink inactivity timer, and wherein the at least one processor is configured to allow the start of the DRX mode also in response to expiration of the inactivity timer.

14. The apparatus of clause 13, wherein the at least one processor is configured to reset the inactivity timer in response to a second grant for a second transmission during the inactivity timer, wherein a new duration of the inactivity timer is one of the configured duration for the sidelink inactivity timer or a configured duration for an inactivity timer for a link between the first UE and the base station, wherein the new duration is based on a link of the second transmission.

15. The apparatus of clause 14, wherein the configured duration of the sidelink inactivity timer is different than the configured duration of the inactivity timer for the link between the first UE and the base station, wherein the at least one processor is configured to monitor a remaining portion of the inactivity timer in response to determining that the remaining portion of the inactivity timer is greater than a configured inactivity timer for the link of the second transmission.

16. The apparatus of any of clauses 13-15, wherein the inactivity timer is specific for a sidelink and is not reset in response to a grant for a link between the first UE and the base station.

17. The apparatus of any of clauses 12-16, wherein the configured duration of the sidelink round trip time timer and the configured duration of the sidelink retransmission timer are specific for a direction of the transmission.

18. The apparatus of any of clauses 12-17, wherein the configured duration of the sidelink round trip time timer and the configured duration of the sidelink retransmission timer are specific for a link with the second UE.

19. The apparatus of any of clauses 12-18, wherein the configured duration of the sidelink round trip time timer and the configured duration of the sidelink retransmission timer are specific for a link type, a traffic type, or for the first UE.

20. The apparatus of any of clauses 12-19, wherein the DRX mode includes an on duration in which the first UE monitors for grants and an off duration in which the first UE does not monitor for grants.

21. The apparatus of any of clauses 12-20, wherein the at least one processor being configured to allow start of the DRX mode includes the at least one processor being configured to place the first UE in the DRX mode when no timer defining an active time period is running.

22. The apparatus of any of clauses 12-21, wherein the DRX mode is defined by a set of parameters including a short cycle duration and a short cycle timer that are specific for a sidelink.

23. An apparatus for wireless communication for a first user equipment (UE), comprising:

means for receiving, from a base station, a first sidelink grant for a transmission between the first UE and a second UE;

means for communicating the transmission according to the first sidelink grant;
means for monitoring a configured duration of a sidelink round trip time timer from the transmission;
means for monitoring a configured duration of a sidelink retransmission timer from an end of the sidelink round trip time timer; and
means for allowing start of a discontinuous reception (DRX) mode for the first UE after the configured duration of the sidelink retransmission timer if a second grant is not received from the base station during the sidelink retransmission timer.

24. The apparatus of clause 23, further comprising means for monitoring an inactivity timer from the first sidelink grant, wherein a duration of the inactivity timer is a configured duration for a sidelink inactivity timer, wherein allowing start of the DRX mode is also in response to expiration of the inactivity timer.

25. The apparatus of clause 24, wherein the means for monitoring the inactivity timer is configured to reset the inactivity timer in response to a second grant for a second transmission during the inactivity timer, wherein a new duration of the inactivity timer is one of the configured duration for the sidelink inactivity timer or a configured duration for an inactivity timer for a link between the first UE and the base station, wherein the new duration is based on a link of the second transmission.

26. The apparatus of clause 25, wherein the configured duration of the sidelink inactivity timer is different than the configured duration of the inactivity timer for the link between the first UE and the base station, wherein the means for monitoring the inactivity timer is configured to monitor a remaining portion of the inactivity timer in response to determining that the remaining portion of the inactivity timer is greater than a configured inactivity timer for the link of the second transmission.

27. The apparatus of any of clauses 24-26, wherein the inactivity timer is specific for a sidelink and is not reset in response to a grant for a link between the first UE and the base station.

28. The apparatus of any of clauses 23-27, wherein the configured duration of the sidelink round trip time timer and the configured duration of the sidelink retransmission timer are specific for a direction of the transmission.

29. The apparatus of any of clauses 23-28, wherein the configured duration of the sidelink round trip time timer and the configured duration of the sidelink retransmission timer are specific for a link with the second UE.

30. The apparatus of any of clauses 23-29, wherein the configured duration of the sidelink round trip time timer and the configured duration of the sidelink retransmission timer are specific for a link type, a traffic type, or for the first UE.

31. The apparatus of any of clauses 23-30, wherein the DRX mode includes an on duration in which the first UE monitors for grants and an off duration in which the first UE does not monitor for grants.

32. The apparatus of any of clauses 23-31, wherein the means for allowing start of the DRX mode is configured to place the first UE in the DRX mode when no timer defining an active time period is running.

33. The apparatus of any of clauses 23-32, wherein the DRX mode is defined by a set of parameters including a short cycle duration and a short cycle timer that are specific for a sidelink.

34. A non-transitory computer-readable medium storing computer executable code, the code when executed by a processor of a first user equipment (UE) causes the processor to:
receive, from a base station, a first sidelink grant for a transmission between the first UE and a second UE;
communicate the transmission according to the first sidelink grant;
monitor a configured duration of a sidelink round trip time timer from the transmission;
monitor a configured duration of a sidelink retransmission timer from an end of the sidelink round trip time timer; and
allow start of a discontinuous reception (DRX) mode for the first UE after the configured duration of the sidelink retransmission timer if a second grant is not received from the base station during the sidelink retransmission timer.

35. The non-transitory computer-readable medium of clause 34, further comprising code to monitor an inactivity timer from the first sidelink grant, wherein a duration of the inactivity timer is a configured duration for a sidelink inactivity timer, and wherein the start of the DRX mode is also in response to expiration of the inactivity timer.

36. The non-transitory computer-readable medium of clause 35, non-transitory computer-readable medium comprises code to reset the inactivity timer in response to a second grant for a second transmission during the inactivity timer, wherein a new duration of the inactivity timer is one of the configured duration for the sidelink inactivity timer or a configured duration for an inactivity timer for a link between the first UE and the base station, wherein the new duration is based on a link of the second transmission.

37. The non-transitory computer-readable medium of clause 36, wherein the configured duration of the sidelink inactivity timer is different than the configured duration of the inactivity timer for the link between the first UE and the base station, wherein the non-transitory computer-readable medium comprises code to monitor a remaining portion of the inactivity timer in response to determining that the remaining portion of the inactivity timer is greater than a configured inactivity timer for the link of the second transmission.

38. The non-transitory computer-readable medium of any of clauses 35-37, wherein the inactivity timer is specific for a sidelink and is not reset in response to a grant for a link between the first UE and the base station.

39. The non-transitory computer-readable medium of any of clauses 34-38, wherein the configured duration of the sidelink round trip time timer and the configured duration of the sidelink retransmission timer are specific for a direction of the transmission.

40. The non-transitory computer-readable medium of any of clauses 34-39, wherein the configured duration of the sidelink round trip time timer and the configured duration of the sidelink retransmission timer are specific for a link with the second UE.

41. The non-transitory computer-readable medium of any of clauses 34-40, wherein the configured duration of the sidelink round trip time timer and the configured duration of the sidelink retransmission timer are specific for a link type, a traffic type, or for the first UE.

42. The non-transitory computer-readable medium of any of clauses 34-41, wherein the DRX mode includes an on duration in which the first UE monitors for grants and an off duration in which the first UE does not monitor for grants.

43. The non-transitory computer-readable medium of any of clauses 34-42, further comprising code to enter the DRX mode when no timer defining an active time period is running.
44. The non-transitory computer-readable medium of any of clauses 34-43, wherein the DRX mode is defined by a set of parameters including a short cycle duration and a short cycle timer that are specific for a sidelink.
45. A method of wireless communication for a first user equipment (UE), comprising:
   receiving, from a base station, a sidelink resource configuration indicating physical sidelink control channel (PSCCH)/physical sidelink shared channel (PSSCH) occasions on which to monitor a PSCCH for a grant from a second UE;
   identifying an active time for monitoring the PSCCH based on a discontinuous reception (DRX) mode for a link with the base station, the DRX mode including an active state in which a physical downlink control channel (PDCCH) is monitored and an inactive state in which the PDCCH is not monitored; and
   monitoring the PSCCH during one or more of the PSCCH/PSSCH occasions that coincide with the active time.
46. The method of clause 45, wherein the active time for monitoring the PSCCH includes the PSCCH/PSSCH occasions.
47. The method of clause 45 or 46, wherein the first UE is not capable of receiving over both a sidelink and the link with the base station concurrently, wherein the monitoring comprises monitoring the PSCCH and not the PDCCH during the one or more of the PSCCH/PSSCH occasions that coincide with the active time.
48. The method of any of clauses 45-47, further comprising:
receiving a grant from the base station during the active time;
starting an inactivity timer in response to receiving the grant; and
transmitting an awake indication to the second UE in response to the inactivity timer.
49. The method of any of clauses 45-48, further comprising:
   receiving a ping request from one of the base station or the second UE during the active time; and
   transmitting an awake indication to the second UE in response to receiving the ping request.
50. The method of clause 49, wherein the ping request from the base station originates from the second UE.
51. The method of any of clauses 45-50, further comprising:
   transmitting a sidelink grant to the second UE on the PSCCH for a sidelink transmission from the first UE, wherein the sidelink resource configuration indicates resources for transmitting on the PSCCH that are considered the active time for the DRX mode.
52. The method of clause 51, wherein the first UE may sleep on the resources for transmitting on the PSCCH if the first UE has no data to transmit.
53. The method of clause 51 or 52, wherein the resources for transmitting on the PSCCH are specified at a mini-slot level, wherein a portion of a slot including the resources for transmitting includes resources on which to monitor the PSCCH, further comprising monitoring the PSCCH during the resources on which to monitor PSCCH.
54. The method of any of clauses 45-53, further comprising:
   transmitting a sidelink grant to the second UE on the PSCCH for a sidelink transmission from the first UE, wherein the sidelink resource configuration indicates resources for transmitting on the PSCCH; and
   selecting resources to transmit the sidelink grant that are within the active time of the DRX mode.
55. The method of clause 54, further comprising receiving an awake indication from the base station indicating that the second UE is in an active time of a DRX mode for a link between the second UE and the base station, wherein transmitting the sidelink grant is in response to the awake indication.
56. An apparatus for wireless communication for a first user equipment (UE), comprising:
   a memory storing computer-executable instructions; and
   at least one processor coupled to the memory and configured to execute the computer-executable instructions to:
   receive, from a base station, a sidelink resource configuration indicating physical sidelink control channel (PSCCH)/physical sidelink shared channel (PSSCH) occasions on which to monitor a PSCCH for a grant from a second UE;
   identify an active time for monitoring the PSCCH based on a discontinuous reception (DRX) mode for a link with the base station, the DRX mode including an active state in which a physical downlink control channel (PDCCH) is monitored and an inactive state in which the PDCCH is not monitored; and
   monitor the PSCCH during one or more of the PSCCH/PSSCH occasions that coincide with the active time.
57. The apparatus of clause 56, wherein the active time for monitoring the PSCCH includes the PSCCH/PSSCH occasions.
58. The apparatus of clause 56 or 57, wherein the first UE is not capable of receiving over both a sidelink and the link with the base station concurrently, wherein the at least one processor is configured to monitor the PSCCH and not the PDCCH during the one or more of the PSCCH/PSSCH occasions that coincide with the active time.
59. The apparatus of any of clauses 56-58, wherein the at least one processor is further configured to:
receive a grant from the base station during the active time;
start an inactivity timer in response to receiving the grant; and
transmit an awake indication to the second UE in response to the inactivity timer.
60. The apparatus of any of clauses 56-59, wherein the at least one processor is further configured to:
   receive a ping request from one of the base station or the second UE during the active time; and
   transmit an awake indication to the second UE in response to receiving the ping request.
61. The apparatus of clause 60, wherein the ping request from the base station originates from the second UE.
62. The apparatus of any of clauses 56-61, wherein the at least one processor is configured to transmit a sidelink grant to the second UE on the PSCCH for a sidelink transmission from the first UE, wherein the sidelink resource configuration indicates resources for transmitting on the PSCCH that are considered the active time for the DRX mode.
63. The apparatus of clause 62, wherein the first UE may sleep on the resources for transmitting on the PSCCH if the first UE has no data to transmit.
64. The apparatus of clause 62 or 63, wherein the resources for transmitting on the PSCCH are specified at a mini-slot level, wherein a portion of a slot including the resources for transmitting includes resources on which to monitor the PSCCH, wherein the at least one processor is configured to monitor the PSCCH during the resources on which to monitor the PSCCH.

65. The apparatus of any of clauses 56-64, wherein the at least one processor is configured to:
  identify to transmit a sidelink grant to the second UE on the PSCCH for a sidelink transmission from the first UE, wherein the sidelink resource configuration indicates resources for transmitting on the PSCCH; and
  select resources to transmit the sidelink grant that are within the active time of the DRX mode.

66. The apparatus of clause 65, wherein the at least one processor is configured to receive an awake indication from the base station indicating that the second UE is in an active time of a DRX mode for a link between the second UE and the base station, wherein transmitting the sidelink grant is in response to the awake indication.

67. An apparatus for wireless communication for a first user equipment (UE), comprising:
  means for receiving, from a base station, a sidelink resource configuration indicating physical sidelink control channel (PSCCH)/physical sidelink shared channel (PSSCH) occasions on which to monitor a PSCCH for a grant from a second UE;
  means for identifying an active time for monitoring the PSCCH based on a discontinuous reception (DRX) mode for a link with the base station, the DRX mode including an active state in which a physical downlink control channel (PDCCH) is monitored and an inactive state in which the PDCCH is not monitored; and
  means for monitoring the PSCCH during one or more of the PSCCH/PSSCH occasions that coincide with the active time.

68. The apparatus of clause 67, wherein the active time for monitoring the PSCCH includes the PSCCH/PSSCH occasions.

69. The apparatus of clause 67 or 68, wherein the first UE is not capable of receiving over both a sidelink and the link with the base station concurrently, wherein the means for monitoring is configured to monitor the PSCCH and not the PDCCH during the one or more of the PSCCH/PSSCH occasions that coincide with the active time.

70. The apparatus of any of clauses 67-69, wherein the means for identifying the active time is configured to:
  receive a grant from the base station during the active time;
  start an inactivity timer in response to receiving the grant; and
  transmit an awake indication to the second UE in response to the inactivity timer.

71. The apparatus of any of clauses 67-70, further comprising:
  means for receiving a ping request from one of the base station or the second UE during the active time; and
  means for transmitting an awake indication to the second UE in response to receiving the ping request.

72. The apparatus of clause 71, wherein the ping request from the base station originates from the second UE.

73. The apparatus of any of clauses 67-72, further comprising:
  means for transmitting a sidelink grant to the second UE on the PSCCH for a sidelink transmission from the first UE, wherein the sidelink resource configuration indicates resources for transmitting on the PSCCH that are considered the active time for the DRX mode.

74. The apparatus of clause 73, wherein the first UE may sleep on the resources for transmitting on the PSCCH if the first UE has no data to transmit.

75. The apparatus of clause 73 or 74, wherein the resources for transmitting on the PSCCH are specified at a mini-slot level, wherein a portion of a slot including the resources for transmitting includes resources on which to monitor the PSCCH, wherein the means for monitoring is configured to monitor the PSCCH during the resources on which to monitor PSCCH.

76. The apparatus of any of clauses 67-75, further comprising:
  means for transmitting a sidelink grant to the second UE on the PSCCH for a sidelink transmission from the first UE, wherein the sidelink resource configuration indicates resources for transmitting on the PSCCH; and
  means for selecting resources to transmit the sidelink grant that are within the active time of the DRX mode.

77. The apparatus of clause 76, further comprising means for receiving an awake indication from the base station indicating that the second UE is in an active time of a DRX mode for a link between the second UE and the base station, wherein transmitting the sidelink grant is in response to the awake indication.

78. A non-transitory computer-readable medium storing computer executable code, the code when executed by a processor of a first user equipment (UE) causes the processor to:
  receive, from a base station, a sidelink resource configuration indicating physical sidelink control/shared channel (PSCCH/PSSCH) occasions on which to monitor a PSCCH for a grant from a second UE;
  identify an active time for monitoring the PSCCH based on a discontinuous reception (DRX) mode for a link with the base station, the DRX mode including an active state in which a physical downlink control channel (PDCCH) is monitored and an inactive state in which the PDCCH is not monitored; and
  monitor the PSCCH during one or more of the PSCCH/PSSCH occasions that coincide with the active time.

79. The non-transitory computer-readable medium of clause 78, wherein the active time for monitoring the PSCCH includes the PSCCH/PSSCH occasions.

80. The non-transitory computer-readable medium of clause 78 or 79, wherein the first UE is not capable of receiving over both a sidelink and the link with the base station concurrently, wherein the non-transitory computer-readable medium comprises code to monitor the PSCCH and not the PDCCH during the one or more of the PSCCH/PSSCH occasions that coincide with the active time.

81. The non-transitory computer-readable medium of any of clauses 78-80, further comprising code to:
  receive a grant from the base station during the active time;
  start an inactivity timer in response to receiving the grant; and
  transmit an awake indication to the second UE in response to the inactivity timer.

82. The non-transitory computer-readable medium of any of clauses 78-81, further comprising code to: receive a ping request from one of the base station or the second UE during the active time; and
  transmit an awake indication to the second UE in response to receiving the ping request.

83. The non-transitory computer-readable medium of clause 82, wherein the ping request from the base station originates from the second UE.

84. The non-transitory computer-readable medium of any of clauses 78-83, further comprising code to transmit a sidelink grant to the second UE on the PSCCH for a sidelink transmission from the first UE, wherein the sidelink resource configuration indicates resources for transmitting on the PSCCH that are considered the active time for the DRX mode.

85. The non-transitory computer-readable medium of clause 84, wherein the first UE may sleep on the resources for transmitting on the PSCCH if the first UE has no data to transmit.

86. The non-transitory computer-readable medium of clause 84 or 85, wherein the resources for transmitting on the PSCCH are specified at a mini-slot level, wherein a portion of a slot including the resources for transmitting includes resources on which to monitor the PSCCH, wherein the non-transitory computer-readable medium comprises code to monitor the PSCCH during the resources on which to monitor the PSCCH.

87. The non-transitory computer-readable medium of any of clauses 78-86, further comprising code to:
    transmit a sidelink grant to the second UE on the PSCCH for a sidelink transmission from the first UE, wherein the sidelink resource configuration indicates resources for transmitting on the PSCCH; and
    select resources to transmit the sidelink grant that are within the active time of the DRX mode.

88. The non-transitory computer-readable medium of clause 87, further comprising code to receive an awake indication from the base station indicating that the second UE is in an active time of a DRX mode for a link between the second UE and the base station, wherein transmitting the sidelink grant is in response to the awake indication.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The invention claimed is:

1. A method of wireless communication for a first user equipment (UE), comprising:
    receiving a first sidelink grant for a transmission between the first UE and a second UE;
    communicating the transmission according to the first sidelink grant;
    starting a configured duration of a sidelink round trip time timer after the transmission;
    starting a configured duration of a sidelink retransmission timer from an end of the sidelink round trip time timer, wherein the configured duration of the sidelink round trip time timer and the configured duration of the sidelink retransmission timer are specific for a direction of the transmission;
    starting an inactivity timer after receiving the first sidelink grant, wherein a duration of the inactivity timer is a configured duration for a sidelink inactivity;
    allowing start of a discontinuous reception (DRX) mode for the first UE after the configured duration of the sidelink retransmission timer if a second grant for a sidelink retransmission is not received during the sidelink retransmission timer and in response to expiration of the inactivity timer.

2. The method of claim 1, further comprising starting a second inactivity timer in response to a second grant for a second transmission on a link between the first UE and a base station during the inactivity timer, wherein a new duration of the second inactivity timer is a configured duration for an inactivity for the link between the first UE and the base station, wherein the configured duration of the sidelink inactivity is different than the configured duration of the inactivity for the link between the first UE and the base station.

3. The method of claim 1, wherein the configured duration of the inactivity timer is specific for a direction of the transmission.

4. The method of claim 1, wherein the configured duration of the sidelink round trip time timer and the configured duration of the sidelink retransmission timer are specific for a link with the second UE.

5. The method of claim 1, wherein the configured duration of the sidelink round trip time timer and the configured duration of the sidelink retransmission timer are specific for a link type, a traffic type, or for the UE.

6. The method of claim 1, wherein the DRX mode includes an on duration in which the UE monitors for grants and an off duration in which the UE does not monitor for grants.

7. The method of claim 1, wherein allowing start of the DRX mode includes entering the DRX mode when no timer defining an active time period is running.

8. The method of claim 1, wherein the DRX mode is defined by a set of parameters including a short cycle duration and a short cycle timer that are specific for a sidelink.

9. The method of claim 1, wherein the configured duration of the sidelink round trip time timer and the configured duration of the sidelink retransmission timer are for transmitting the transmission and are different than a configured duration of a second sidelink round trip time timer and a configured duration of a second sidelink retransmission timer for receiving the transmission.

10. The method of claim 1, wherein the configured duration of the sidelink round trip time timer and the configured duration of the sidelink retransmission timer are for receiving the transmission and are different than a configured duration of a second sidelink round trip time timer and a configured duration of a second sidelink retransmission timer for transmitting the transmission.

11. The method of claim 10, wherein starting the configured duration of the sidelink round trip time timer after the transmission comprises starting the configured duration of the sidelink round trip time timer after transmission of a positive or negative acknowledgment on a physical sidelink feedback channel.

12. An apparatus for wireless communication for a first user equipment (UE), comprising:
a memory; and
at least one processor coupled to the memory and configured to:
receive a first sidelink grant for a transmission between the first UE and a second UE;
communicate the transmission according to the first sidelink grant;
start a configured duration of a sidelink round trip time timer after the transmission;
start a configured duration of a sidelink retransmission timer from an end of the sidelink round trip time timer, wherein the configured duration of the sidelink round trip time timer and the configured duration of the sidelink retransmission timer are specific for a direction of the transmission;
start inactivity timer after reception of the first sidelink grant, wherein a duration of the inactivity timer is a configured duration for a sidelink inactivity; and
allow start of a discontinuous reception (DRX) mode for the first UE after the configured duration of the sidelink retransmission timer if a third grant for a sidelink retransmission is not received during the sidelink retransmission timer and in response to expiration of the inactivity timer.

13. The apparatus of claim 12, wherein the at least one processor is configured to start a second inactivity timer in response to a second grant for a second transmission on a link between the first UE and a base station during the inactivity timer, wherein a new duration of the inactivity timer is a configured duration for an inactivity for the link between the first UE and the base station, wherein the configured duration of the sidelink inactivity is different than the configured duration of the inactivity for the link between the first UE and the base station.

14. The apparatus of claim 12, wherein the configured duration of the inactivity timer specific for a direction of the transmission.

15. The apparatus of claim 12, wherein the configured duration of the sidelink round trip time timer and the configured duration of the sidelink retransmission timer are specific for a link with the second UE.

16. The apparatus of claim 12, wherein the configured duration of the sidelink round trip time timer and the configured duration of the sidelink retransmission timer are specific for a link type, a traffic type, or for the UE.

17. The apparatus of claim 12, wherein the DRX mode includes an on duration in which the UE monitors for grants and an off duration in which the UE does not monitor for grants.

18. The apparatus of claim 12, wherein to allow start of the DRX mode, the at least one processor is configured to enter the DRX mode when no timer defining an active time period is running.

19. The apparatus of claim 12, wherein the DRX mode is defined by a set of parameters including a short cycle duration and a short cycle timer that are specific for a sidelink.

20. An apparatus for wireless communication for a first user equipment (UE), comprising:
means for receiving, from a base station, a first sidelink grant for a transmission between the first UE and a second UE;
means for communicating the transmission according to the first sidelink grant;
means for monitoring a configured duration of a sidelink round trip time timer after the transmission;
means for starting a configured duration of a sidelink retransmission timer from an end of the sidelink round trip time timer, wherein the configured duration of the sidelink round trip time timer and the configured duration of the sidelink retransmission timer are specific for a direction of the transmission;
means for starting an inactivity timer after reception of the first sidelink grant, wherein a duration of the inactivity timer is a configured duration for a sidelink inactivity; and
means for allowing start of a discontinuous reception (DRX) mode for the first UE after the configured duration of the sidelink retransmission timer if a second grant for a sidelink retransmission is not received during the sidelink retransmission timer and in response to expiration of the inactivity timer.

21. The apparatus of claim 20, wherein the means for starting the inactivity timer is configured to start a second inactivity timer in response to a second grant for a second transmission on a link between the first UE and the base station during the inactivity timer, wherein a new duration of the second inactivity timer is a configured duration for an inactivity for the link between the first UE and the base station, wherein the configured duration of the sidelink inactivity is different than the configured duration of the inactivity for the link between the first UE and the base station.

22. The apparatus of claim 20, wherein the configured duration of the sidelink round trip time timer and the configured duration of the sidelink retransmission timer are specific for a direction of the transmission.

23. The apparatus of claim 20, wherein the configured duration of the sidelink round trip time timer and the configured duration of the sidelink retransmission timer are specific for a link with the second UE.

24. A non-transitory computer-readable medium storing computer-executable instructions that when executed by a processor of a user equipment (UE) cause the UE to:
receive a first sidelink grant for a transmission between the first UE and a second UE;
communicate the transmission according to the first sidelink grant;
start a configured duration of a sidelink round trip time timer after the transmission;
start a configured duration of a sidelink retransmission timer from an end of the sidelink round trip time timer;

start an inactivity timer after reception of the first sidelink grant, wherein a duration of the inactivity timer is a configured duration for a sidelink inactivity, wherein the configured duration of the sidelink round trip time timer and the configured duration of the sidelink retransmission timer are specific for a direction of the transmission; and allow start of a discontinuous reception (DRX) mode for the first UE after the configured duration of the sidelink retransmission timer if a second grant for a sidelink retransmission is not received from the base station during the sidelink retransmission timer and in response to expiration of the inactivity timer.

25. The non-transitory computer-readable medium of claim 24, further comprising instructions that cause the UE to start a second inactivity timer in response to a second grant for a second transmission on a link between the first UE and a base station during the inactivity timer, wherein a new duration of the second inactivity timer is a configured duration for an inactivity for the link between the first UE and the base station, wherein the configured duration of the sidelink inactivity is different than the configured duration of the inactivity for the link between the first UE and the base station.

* * * * *